(12) United States Patent
Xiang et al.

(10) Patent No.: US 11,342,635 B2
(45) Date of Patent: May 24, 2022

(54) ELECTRODE PLATE AND ELECTRODE ASSEMBLY USING THE SAME

(71) Applicant: Ningde Amperex Technology Ltd., Ningde (CN)

(72) Inventors: Li Xiang, Ningde (CN); YiSong Su, Ningde (CN); Qiaoshu Hu, Ningde (CN); Ying Shao, Ningde (CN)

(73) Assignee: NINGDE AMPEREX TECHNOLOGY LTD., Ningde (CN)

( * ) Notice: Subject to any disclaimer, the term of this patent is extended or adjusted under 35 U.S.C. 154(b) by 397 days.

(21) Appl. No.: 16/395,535

(22) Filed: Apr. 26, 2019

(65) Prior Publication Data
US 2020/0295338 A1    Sep. 17, 2020

(30) Foreign Application Priority Data
Mar. 12, 2019    (CN) .......................... 201910186323.7

(51) Int. Cl.
*H01M 50/529*    (2021.01)
*H01M 4/66*    (2006.01)
*H01M 50/46*    (2021.01)
*H01M 50/531*    (2021.01)

(52) U.S. Cl.
CPC ......... *H01M 50/529* (2021.01); *H01M 4/667* (2013.01); *H01M 50/46* (2021.01); *H01M 50/531* (2021.01)

(58) Field of Classification Search
CPC .... H01M 50/529; H01M 4/667; H01M 50/46; H01M 50/531; H01M 50/538
See application file for complete search history.

(56) References Cited

U.S. PATENT DOCUMENTS

| | | | |
|---|---|---|---|
| 2011/0104561 A1* | 5/2011 | Kim | H01M 10/0431 429/181 |
| 2013/0177787 A1* | 7/2013 | Arima | H01M 50/581 429/62 |
| 2020/0152952 A1* | 5/2020 | Heo | H01M 50/538 |
| 2020/0176749 A1* | 6/2020 | Deutmeyer | H01M 50/543 |

FOREIGN PATENT DOCUMENTS

CN    205609666 U    9/2016

* cited by examiner

*Primary Examiner* — Stewart A Fraser
(74) *Attorney, Agent, or Firm* — Ladas & Parry LLP

(57) ABSTRACT

An electrode assembly includes a cathode electrode plate, an anode electrode plate, and a separator disposed between the cathode electrode plate and the anode electrode plate. At least one of the cathode electrode plate and the anode electrode plate is an electrode plate which includes a current collector and a first conductive connector. The current collector includes an insulating layer having opposite side surfaces, a first conductive layer, a second conductive layer, and two electrode active substance layers. The first conductive layer and the second conductive layer are arranged on opposite side surfaces, and the two electrode active substance layers are coated onto the first conductive layer and the second conductive layer. The first conductive connector electrically connects the first conductive layer and the second conductive layer. The electrode assembly is formed by coiling the cathode electrode plate, the separator, and the anode electrode plate.

20 Claims, 33 Drawing Sheets

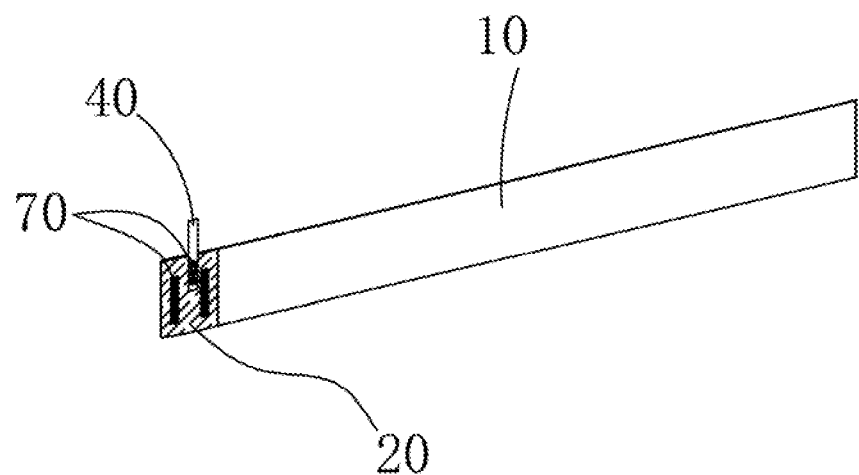
FIG. 1.1.1

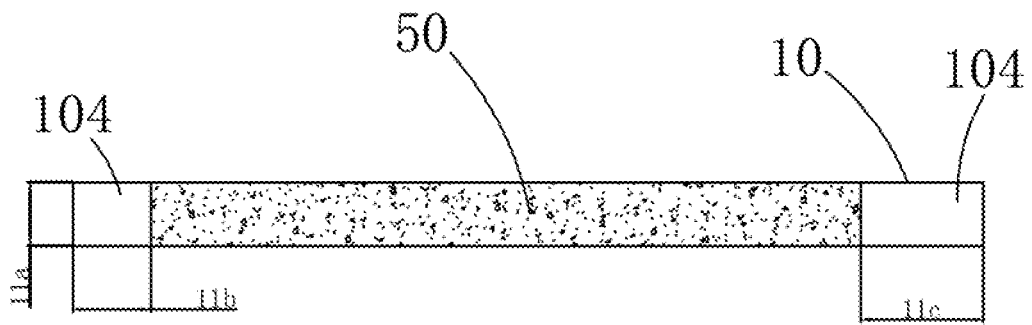
FIG. 1.1.2

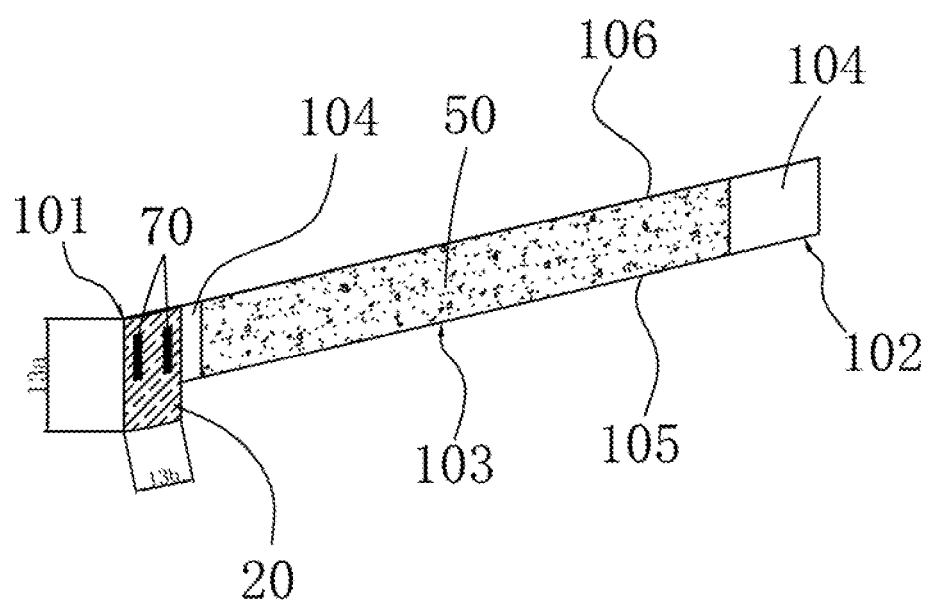
FIG. 1.3

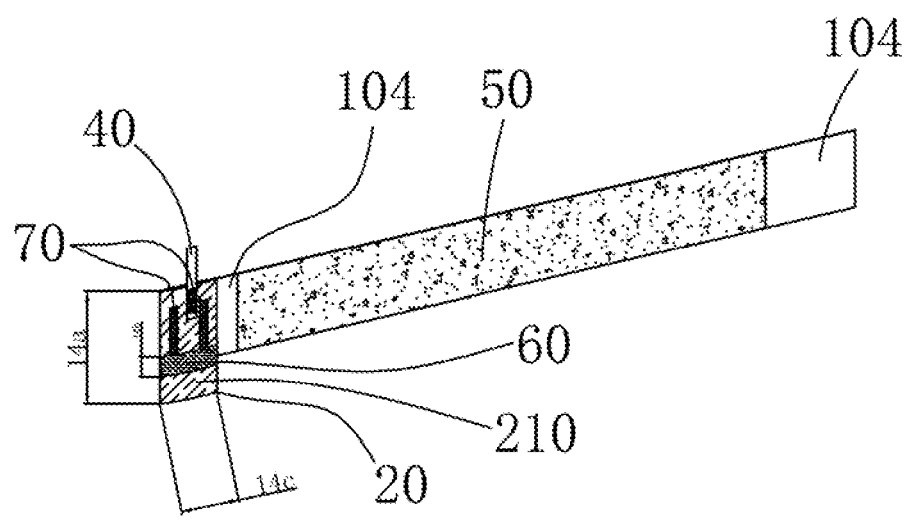
FIG. 1.4

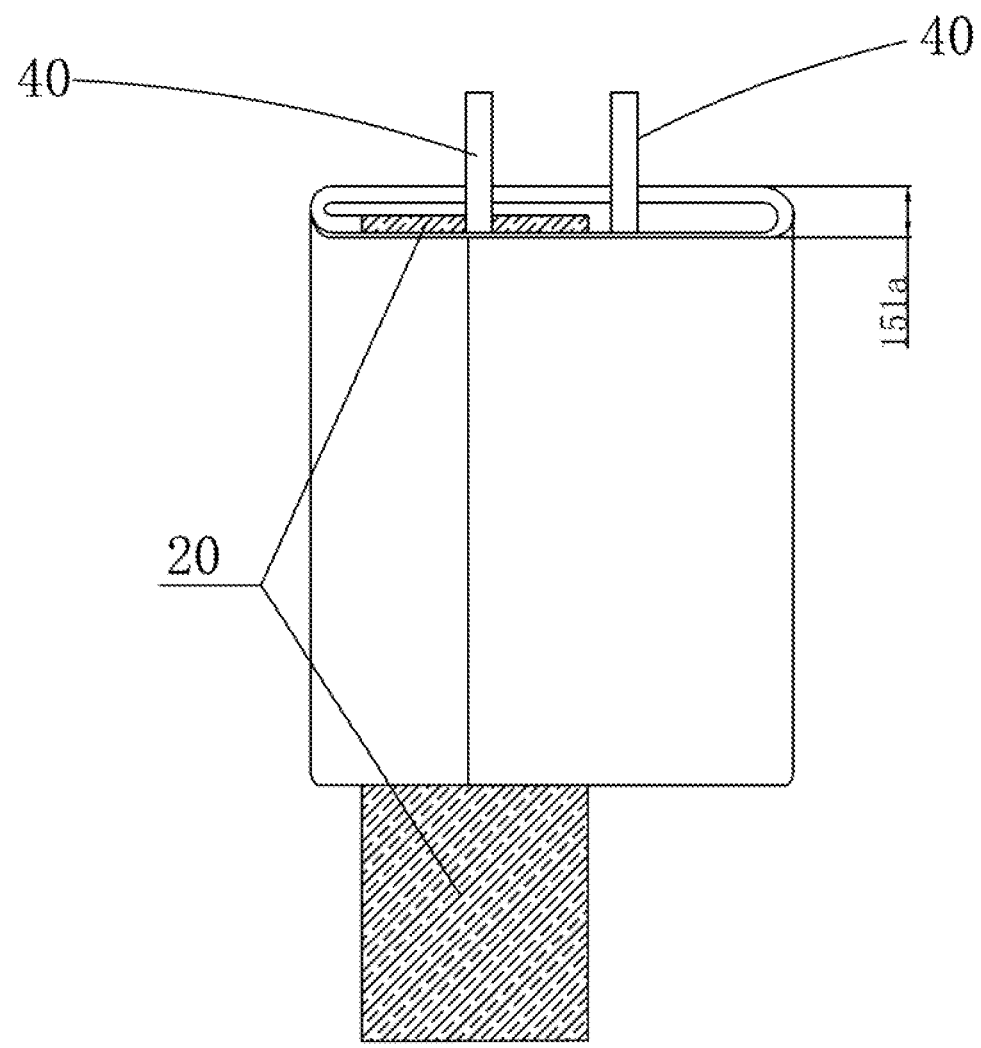
FIG. 1.5.1

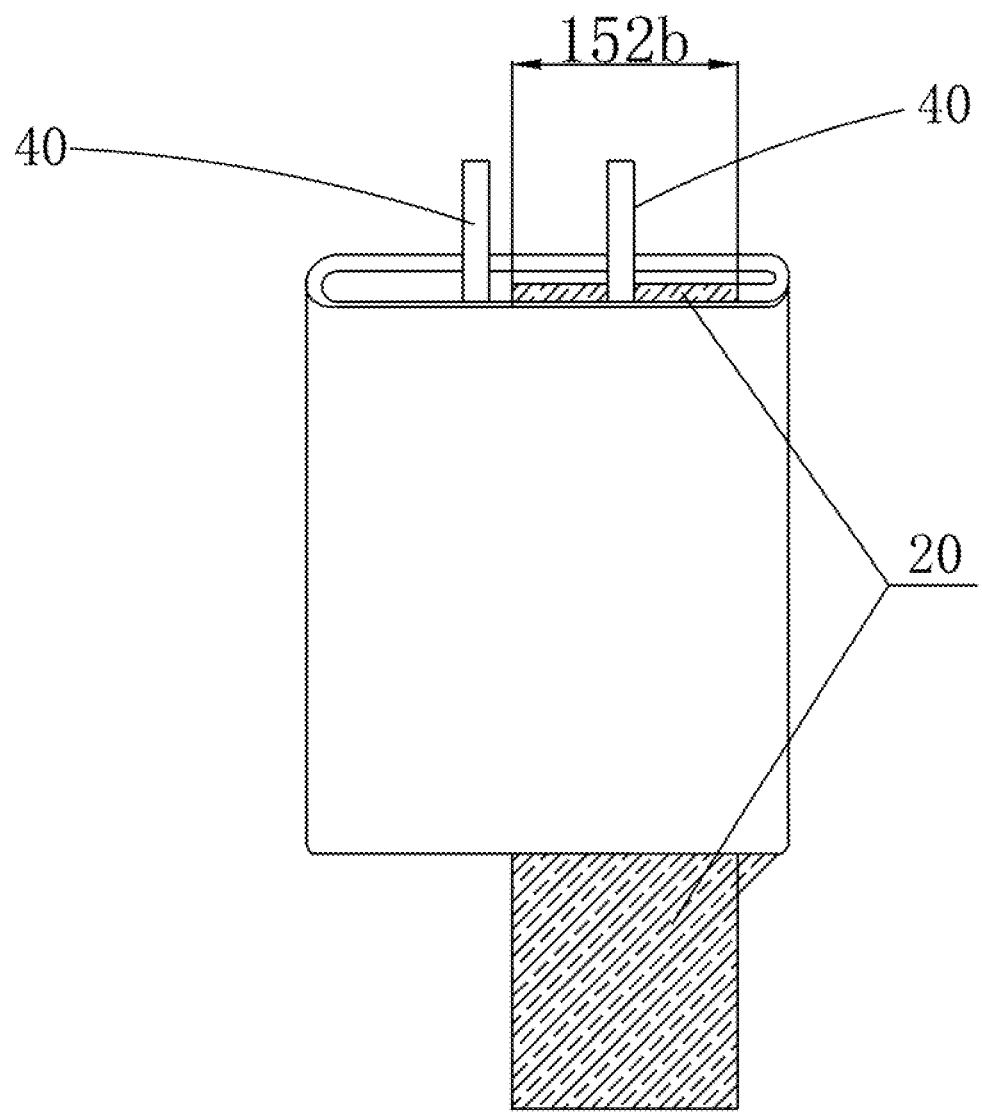
FIG. 1. 5. 2

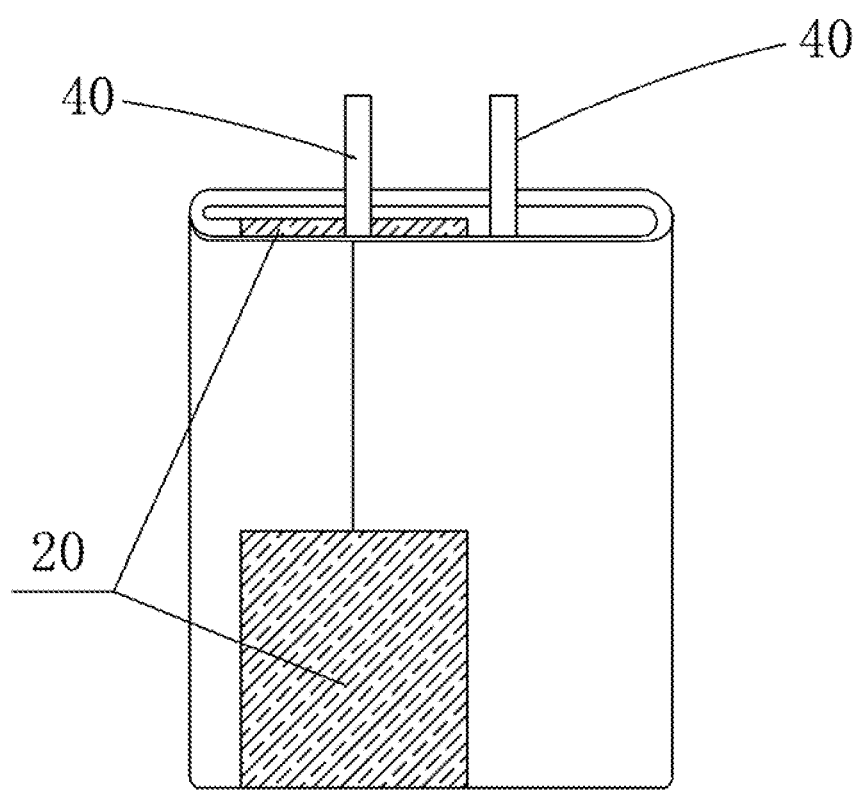
FIG. 1. 6. 1

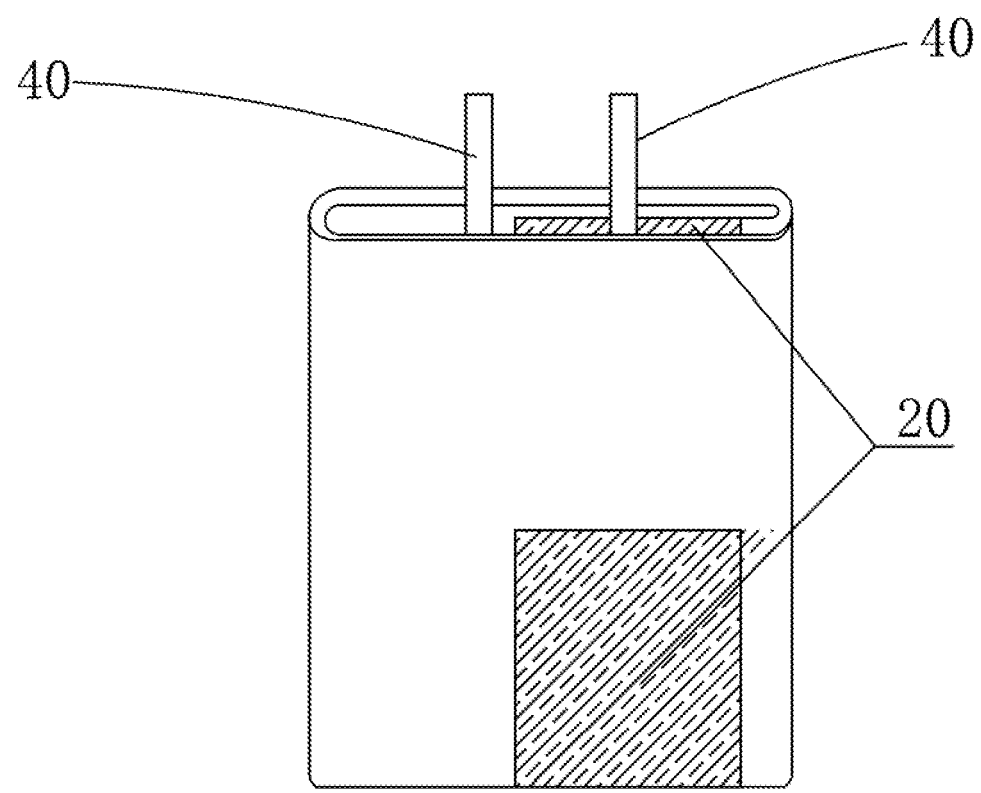
FIG. 1.6.2

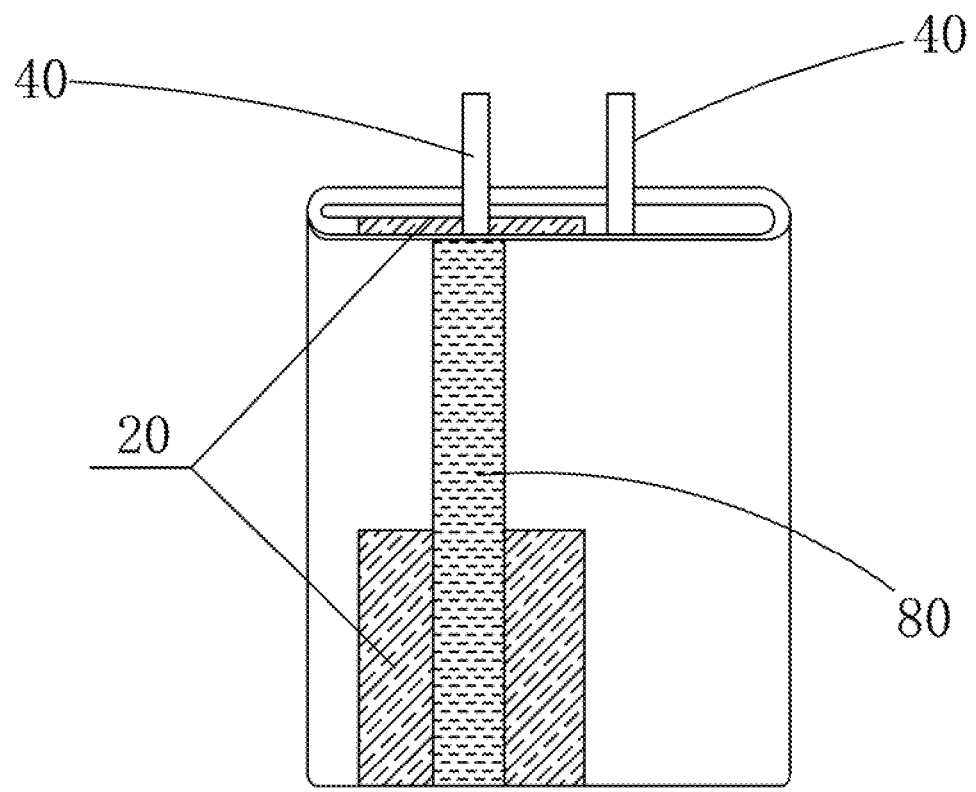
FIG. 1.7.1

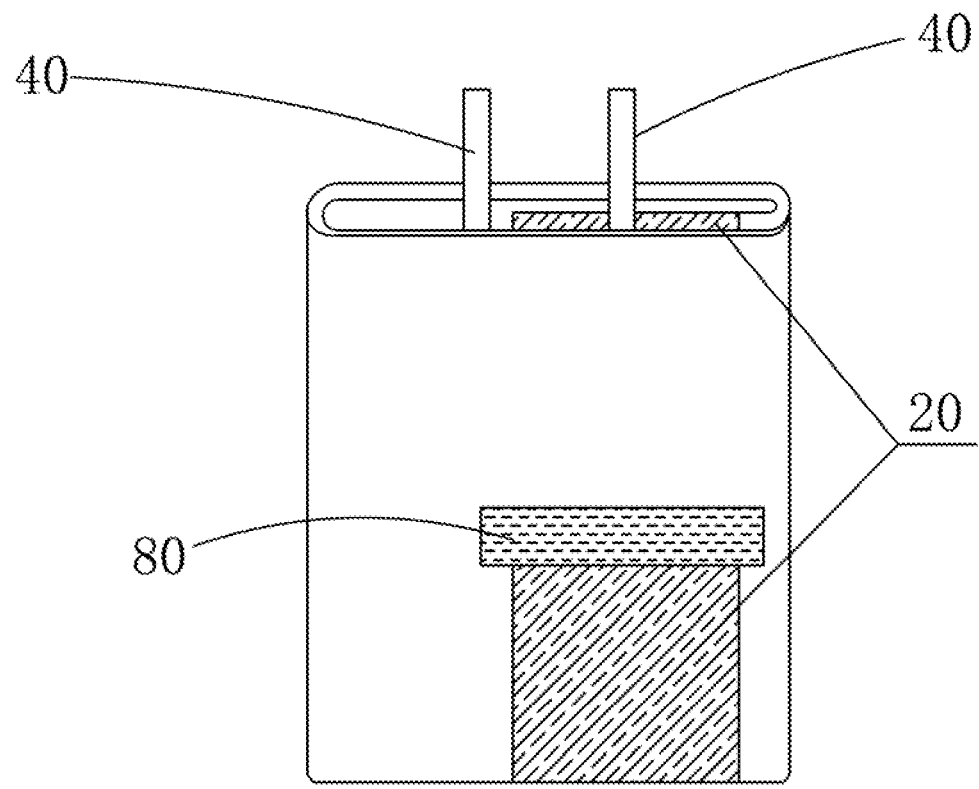
FIG. 1.7.2

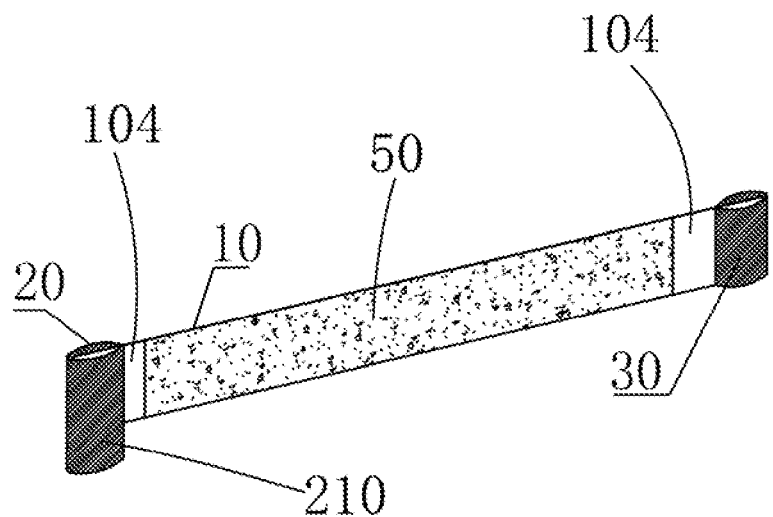
FIG. 2.1

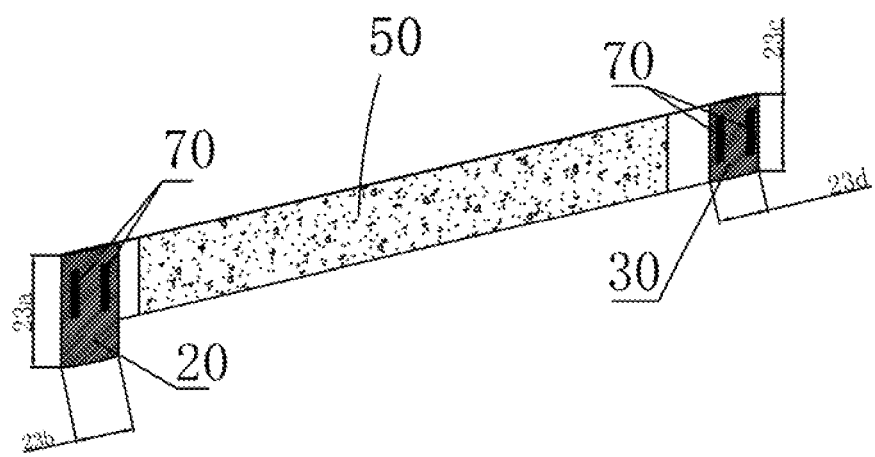
FIG. 2.2

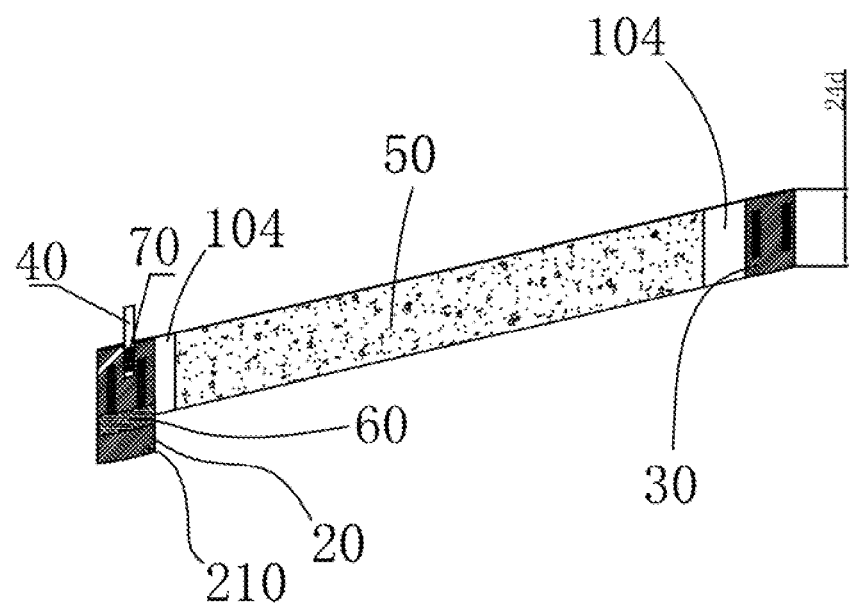
FIG. 2.3

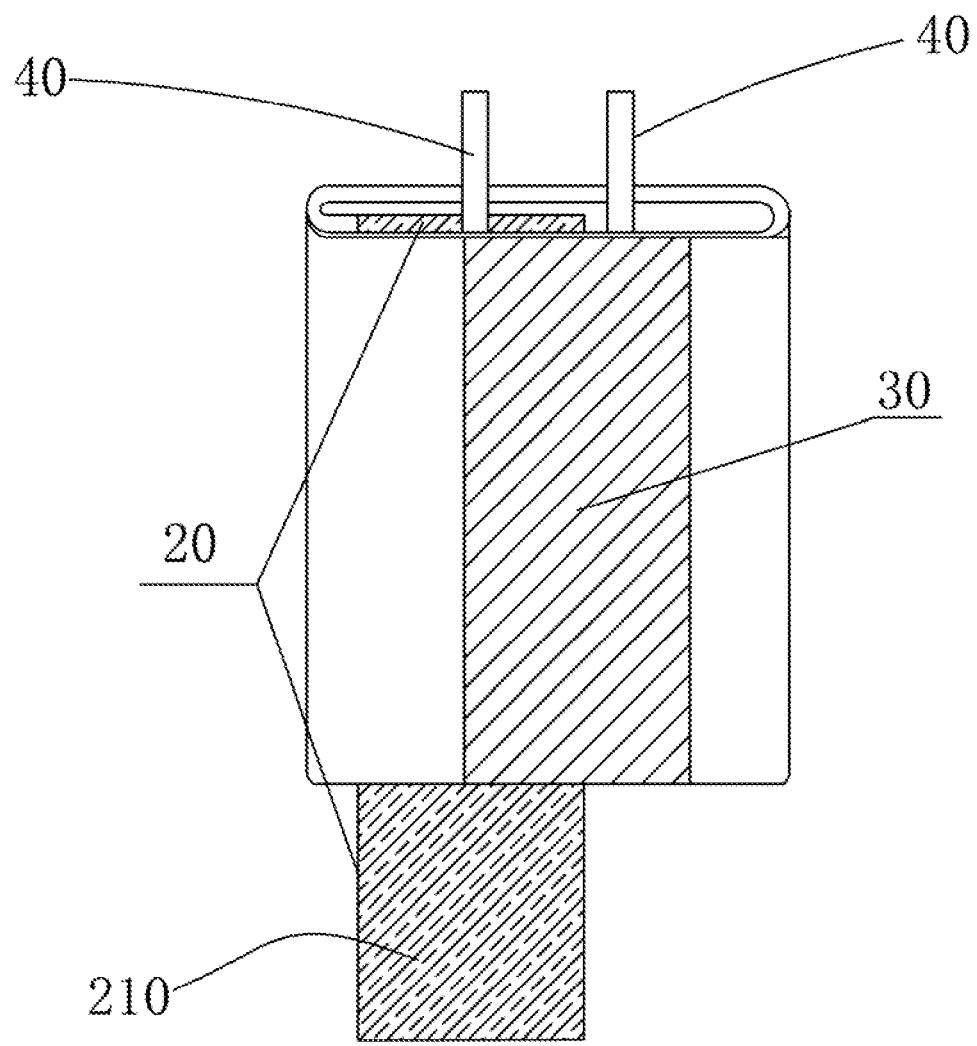
FIG. 2.4

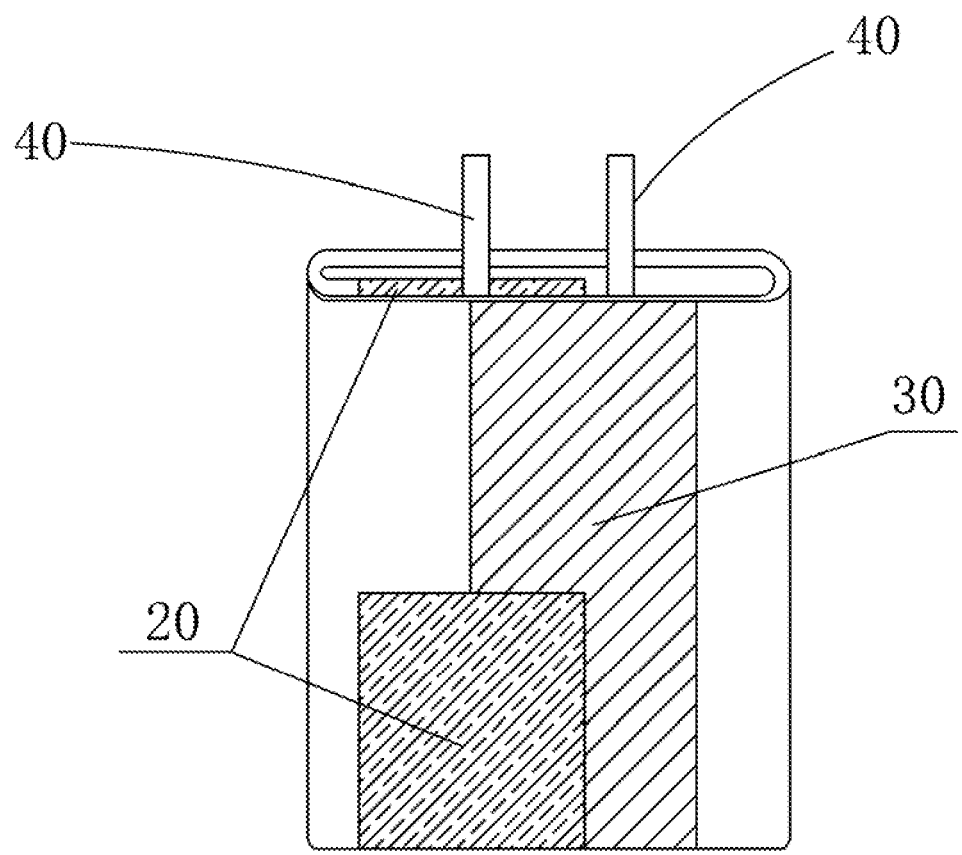
FIG. 2.5

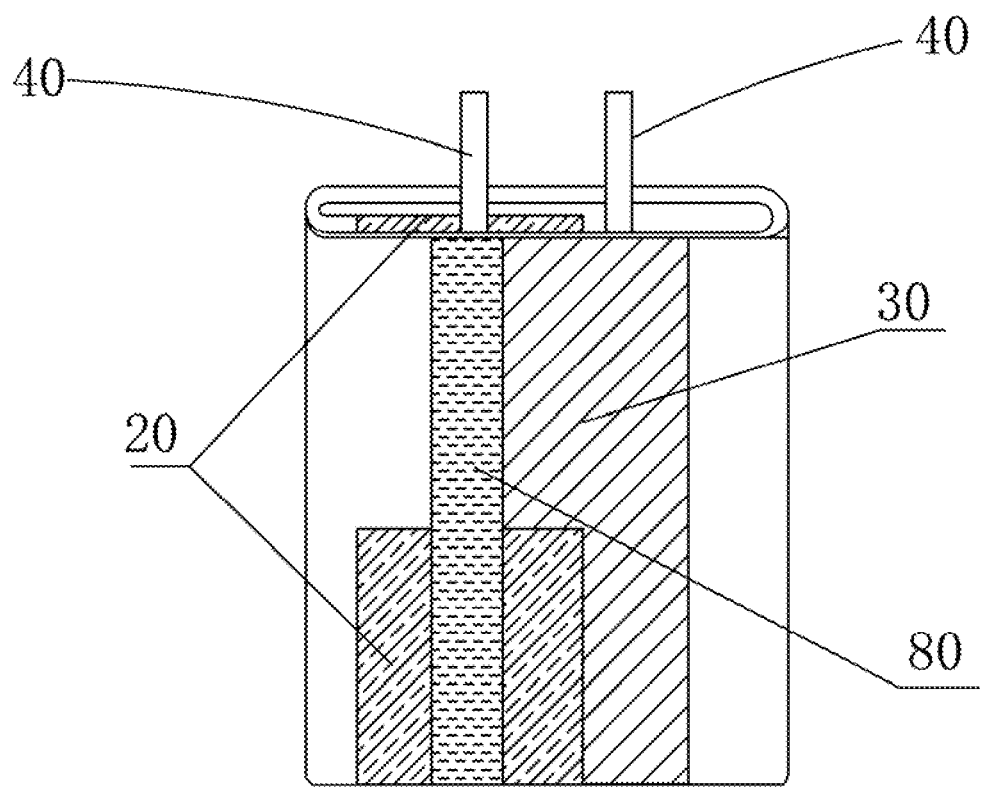
FIG. 2.6

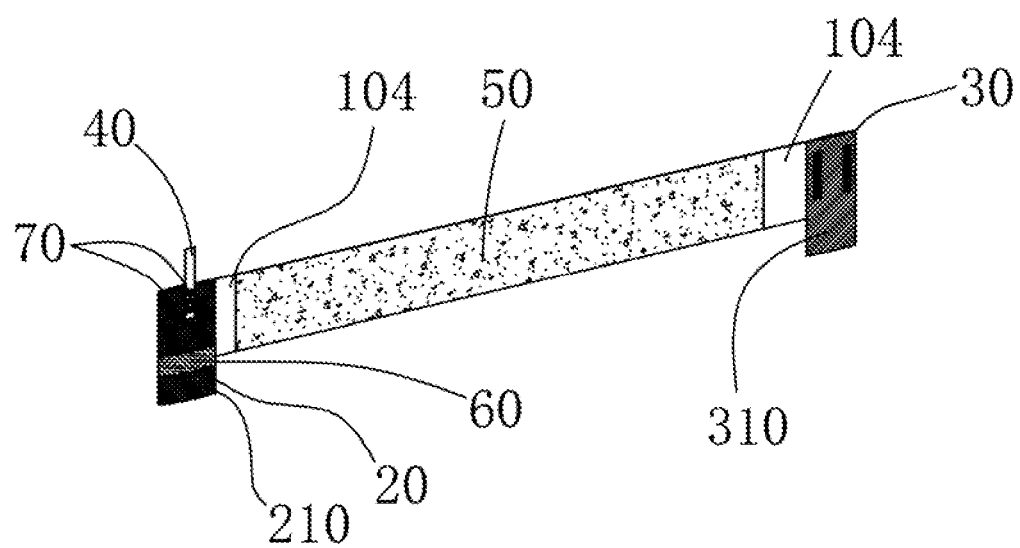
FIG. 3.1

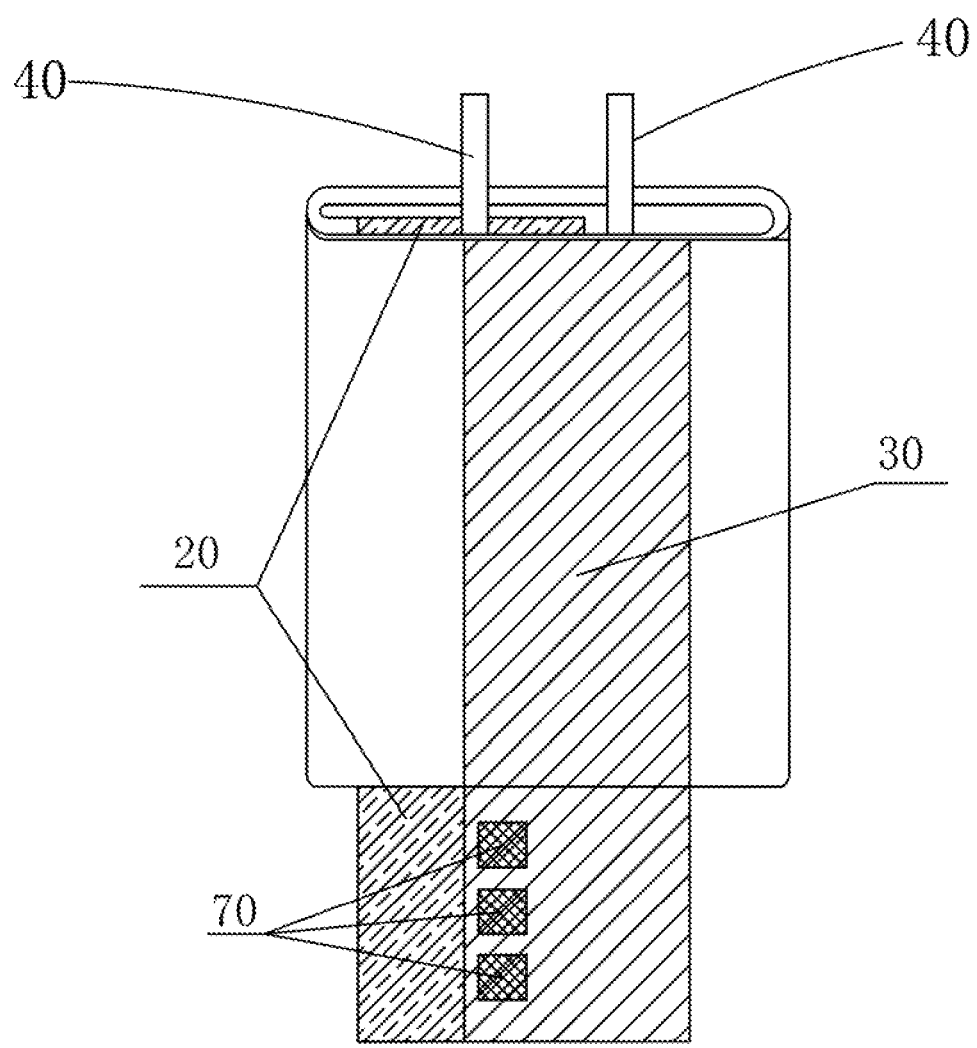
FIG. 3.2

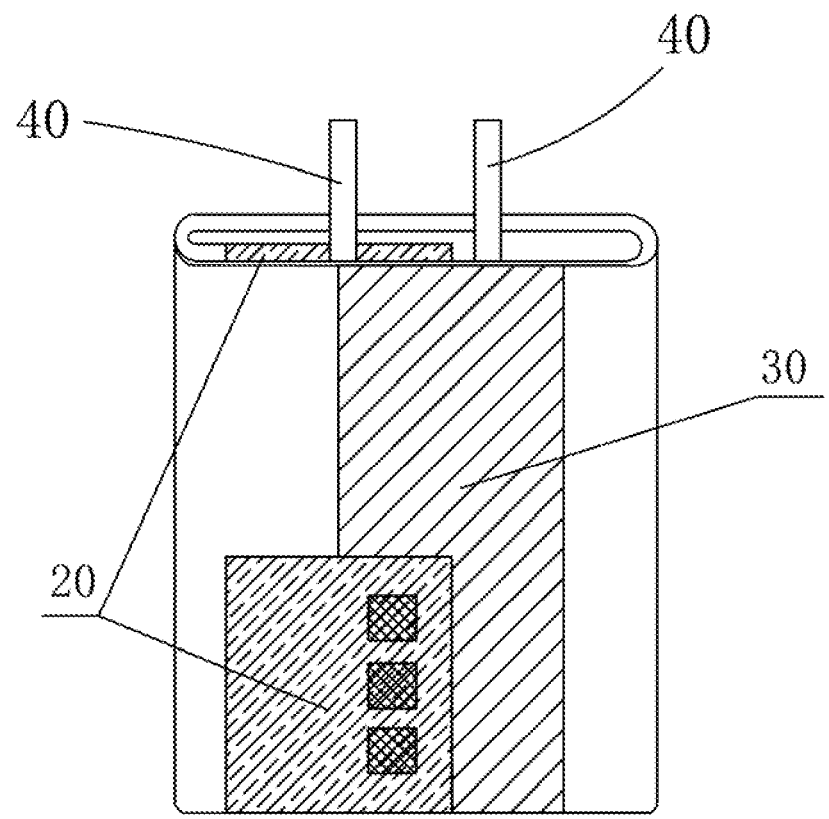
FIG. 3.3

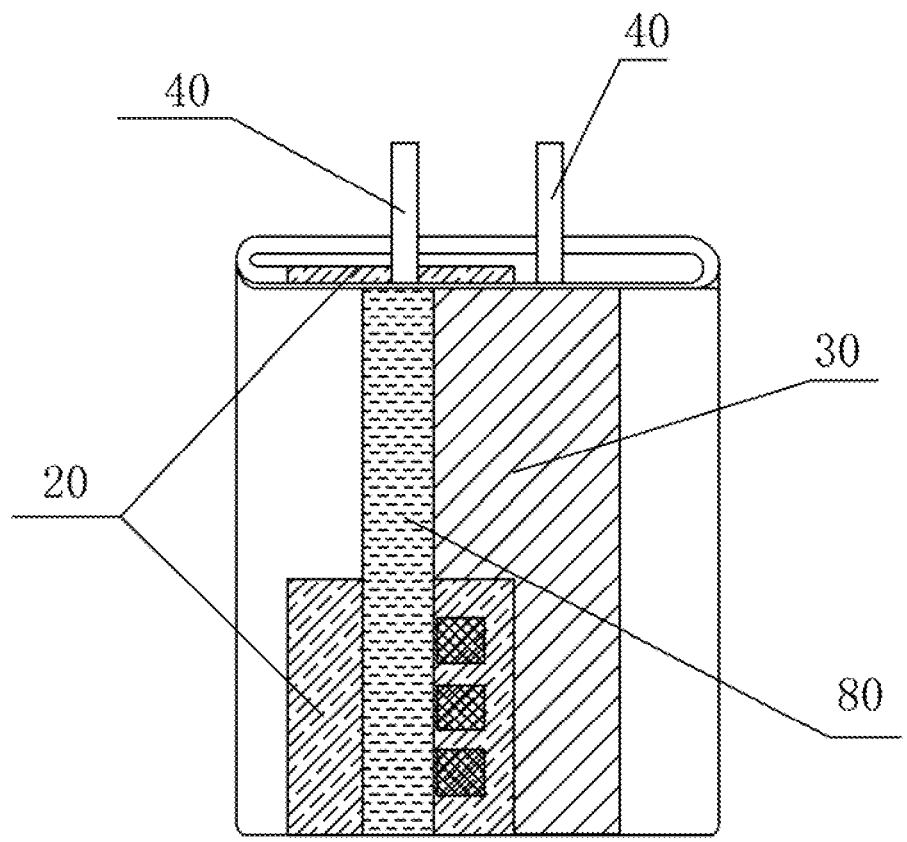
FIG. 3.4

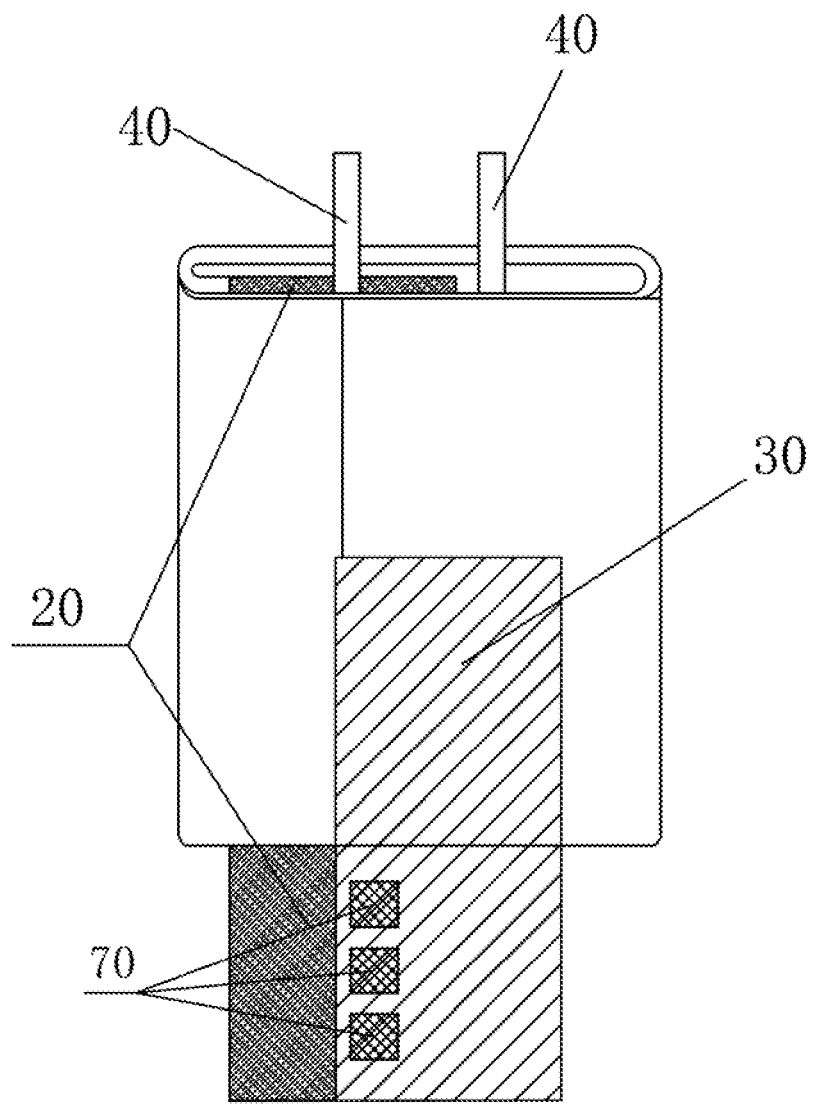
FIG. 4.2

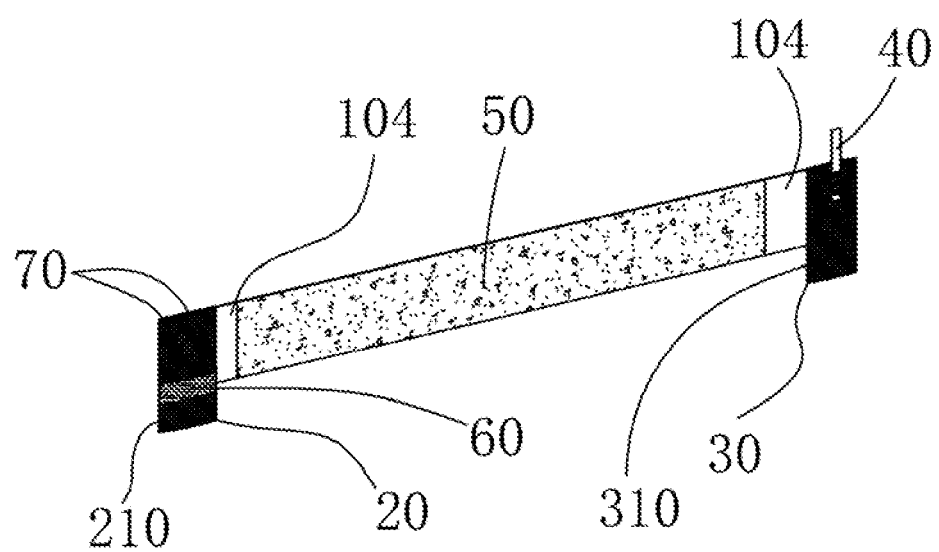
FIG. 5.1

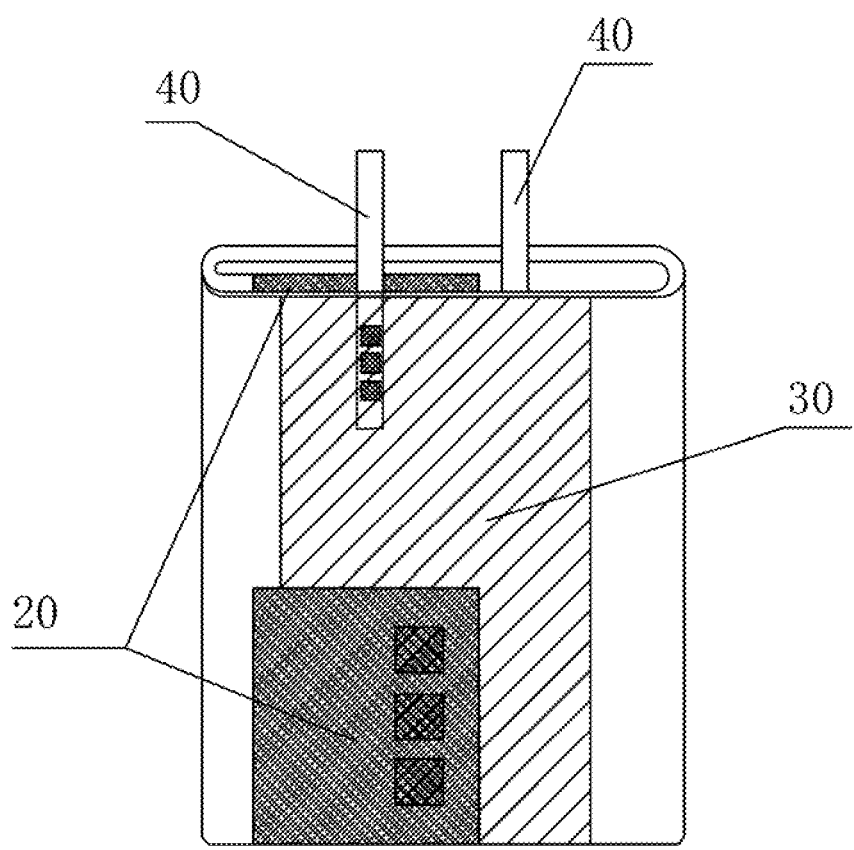
FIG. 5.2

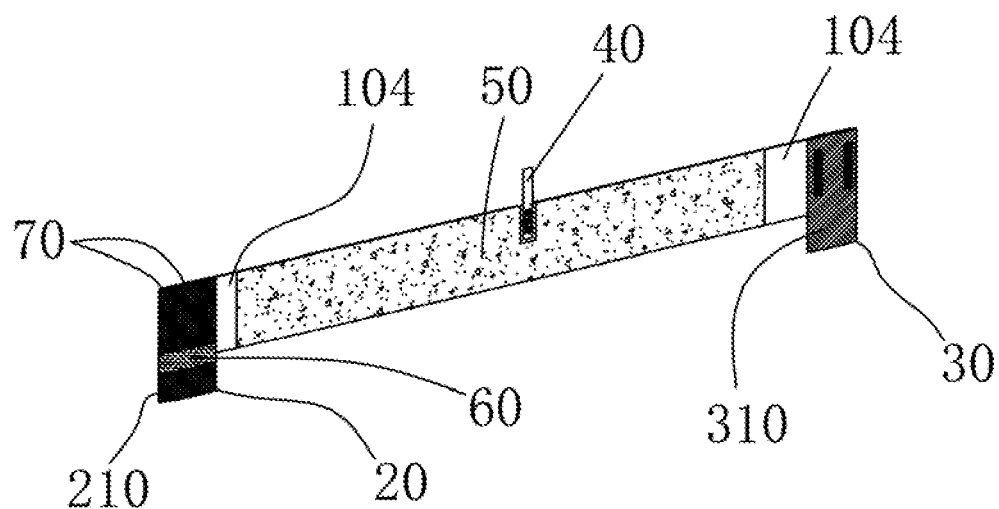
FIG. 6.1

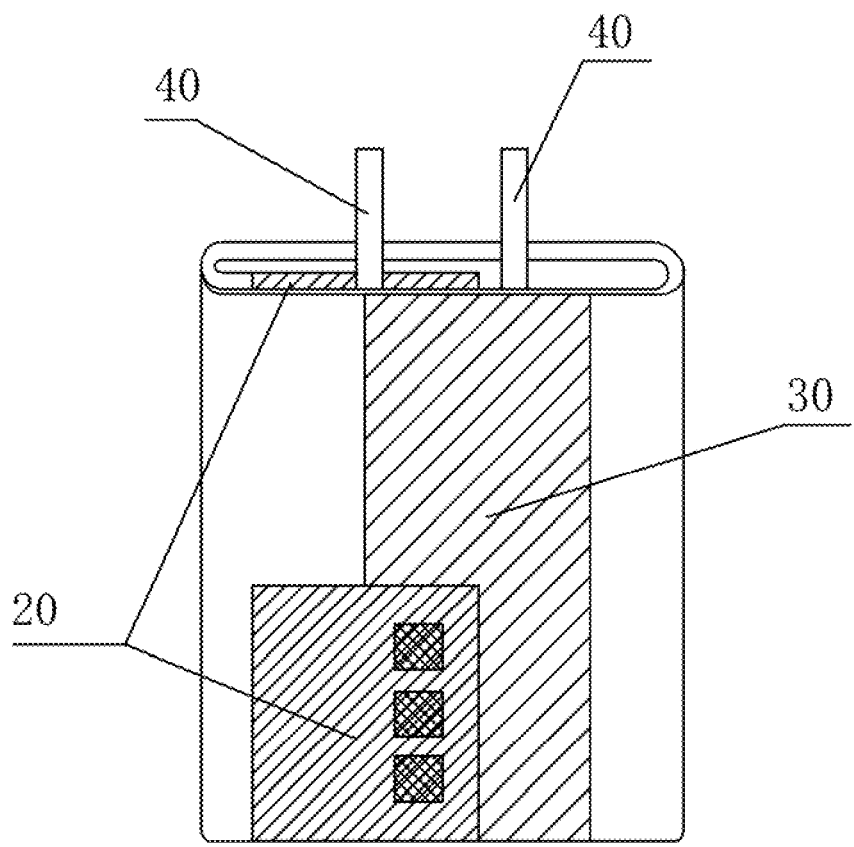
FIG. 6.2

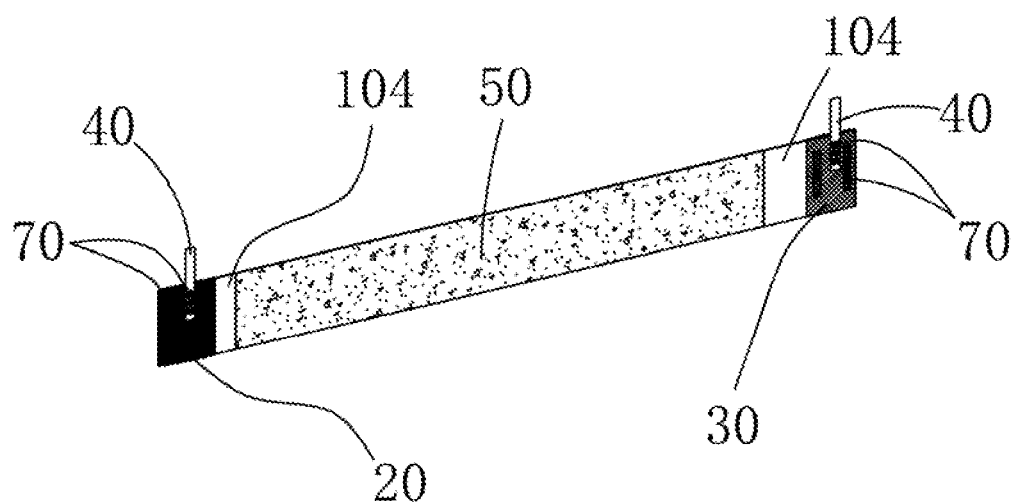
FIG. 7.1

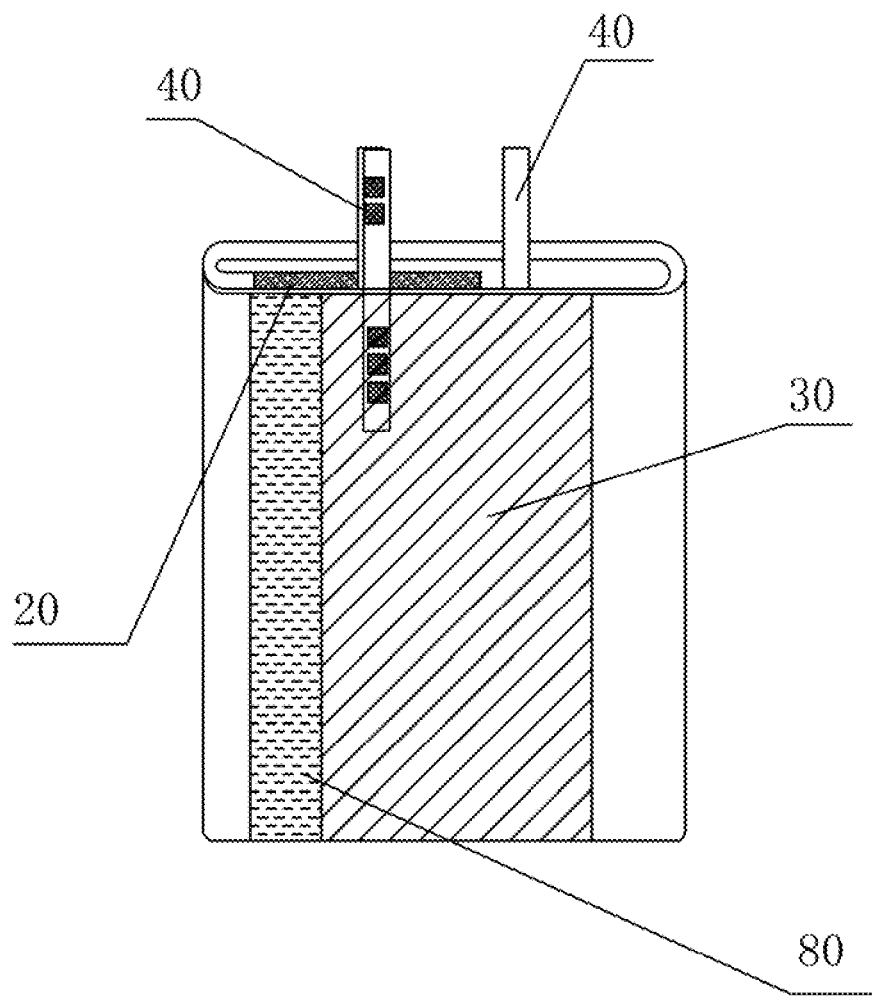
FIG. 7.2

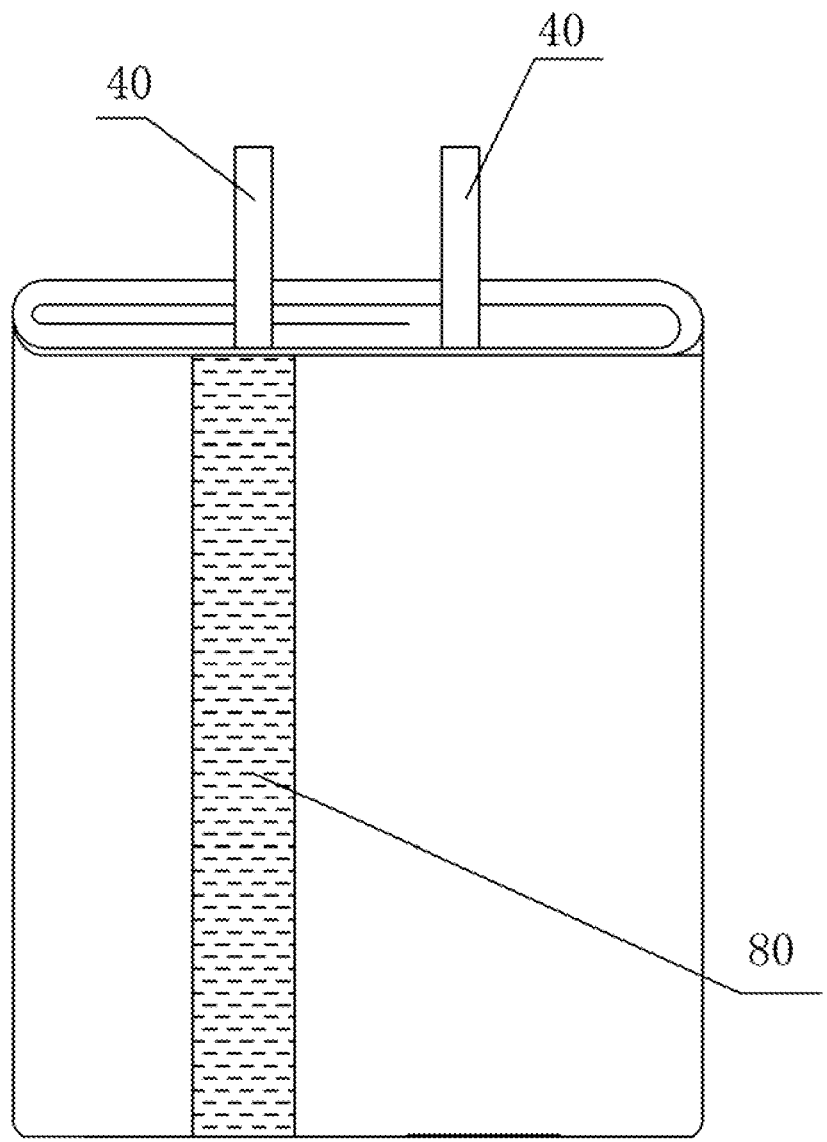
FIG. 8.2

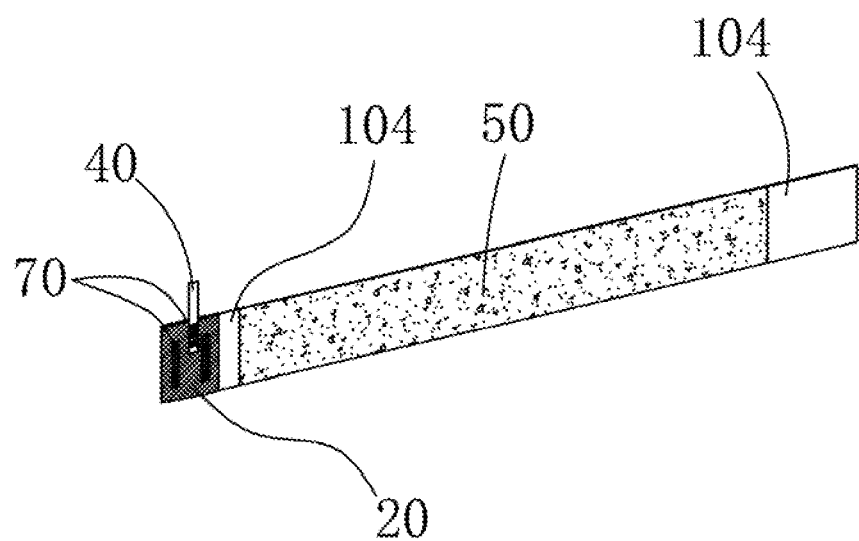
FIG. 9.1

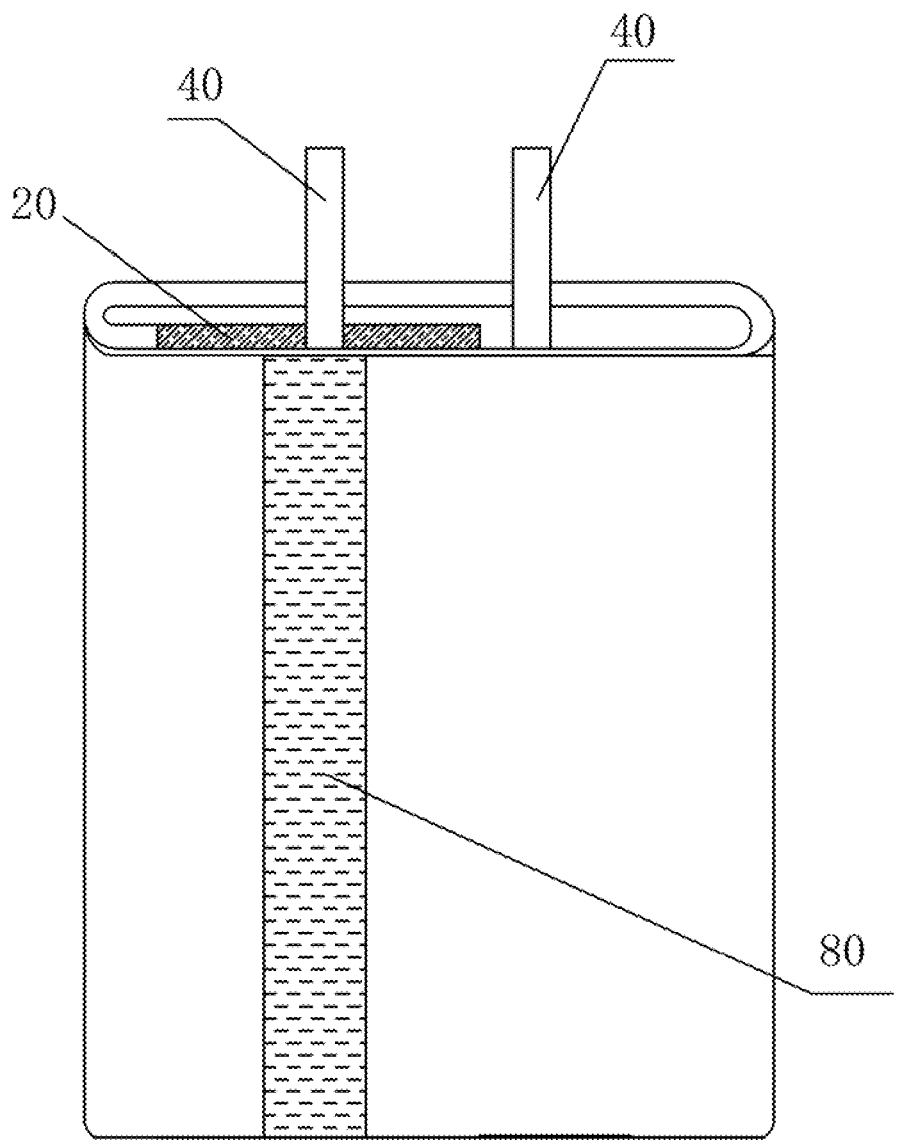
FIG. 9.2

ELECTRODE PLATE AND ELECTRODE ASSEMBLY USING THE SAME

FIELD

The subject matter herein generally relates to batteries, in particular, to an electrode plate and an electrode assembly with the electrode plate.

BACKGROUND

Lithium ion batteries have superior properties such as high voltage, high energy density, low self-discharge rate, low toxicity, light weight, etc. Safety of lithium ion batteries of exploding or catching fire in collisions or being impacted may be a concern. Lithium ion batteries usually use metallic foils made of copper, aluminum, or nickel as a current collector. Due to restrictions on the thickness of the metallic foil, breakages of current collectors when soldering electrode tabs to the current collectors are common, and safety of lithium ion batteries can be adversely affected.

Therefore, there is room for improvement in the art.

BRIEF DESCRIPTION OF THE DRAWINGS

Embodiments of the present disclosure will now be described, with reference to the attached figures.

FIG. 1.1.2 is an isometric view of a current collector in an embodiment.

FIG. 1.2 is a sectional view of the current collector of FIG. 1.1.2 along a length direction.

FIG. 1.3 is an isometric view of the current collector of FIG. 1.1.2 and a first conductive connector.

FIG. 1.4 is an isometric view of an electrode plate in a second embodiment.

FIG. 1.5.1 is an isometric view of the electrode assembly in the second embodiment, showing a positive electrode plate with an end located laterally and an extended protrusion of the positive electrode plate.

FIG. 1.5.2 is an isometric view of an electrode assembly in a third embodiment, showing a positive electrode plate with an end located laterally in the electrode assembly and an extended protrusion of the positive electrode plate.

FIG. 1.6.1 is another isometric view of the electrode assembly of FIG. 1.5.1, showing the protrusion of the positive electrode plate being folded.

FIG. 1.6.2 is another isometric view of the electrode assembly of FIG. 1.5.2, showing the protrusion of the positive electrode plate being folded.

FIG. 1.7.1 is an isometric view of the electrode assembly of FIG. 1.6.1 and a fixing tape fixed to the electrode assembly.

FIG. 1.7.2 is an isometric view of the electrode assembly of FIG. 1.6.2 and a fixing tape fixed to the electrode assembly.

FIG. 2.1 is an isometric view of a current collector, a first conductive connector, and a second conductive connector in a fourth embodiment, wherein the first conductive connector and the second conductive connector are not soldered to the current collector.

FIG. 2.2 is another isometric view of a current collector, a first conductive connector, and a second conductive connector of FIG. 2.1, wherein the first conductive connector and the second conductive connector are soldered to the current collector.

FIG. 2.3 is an isometric view of an electrode plate in a fourth embodiment.

FIG. 2.4 is an isometric view of an electrode assembly in the fourth embodiment, showing a positive electrode plate with an end located laterally in the electrode assembly and an extended protrusion of the positive electrode plate.

FIG. 2.5 is another isometric view of the electrode assembly of FIG. 2.4, showing the protrusion of the positive electrode plate folded.

FIG. 2.6 is an isometric view of the electrode assembly of FIG. 2.5 and a fixing tape fixed to the electrode assembly.

FIG. 3.1 is an isometric view of an electrode plate in a fifth embodiment.

FIG. 3.2 is an isometric view of an electrode assembly in the fifth embodiment, showing a positive electrode plate with an end located laterally in the electrode assembly and an extended protrusion of the positive electrode plate.

FIG. 3.3 is another isometric view of the electrode assembly of FIG. 3.2, showing the protrusion of the positive electrode plate being folded.

FIG. 3.4 is an isometric view of the electrode assembly of FIG. 3.3 and a fixing tape fixed to the electrode assembly.

FIG. 4.2 is an isometric view of an electrode assembly in the sixth embodiment.

FIG. 5.1 is an isometric view of an electrode plate in a seventh embodiment.

FIG. 5.2 is an isometric view of an electrode assembly in the seventh embodiment.

FIG. 6.1 is an isometric view of an electrode plate in an eighth embodiment.

FIG. 6.2 is an isometric view of an electrode assembly in the eighth embodiment.

FIG. 7.1 is an isometric view of an electrode plate in a ninth embodiment.

FIG. 7.2 is an isometric view of an electrode assembly in the ninth embodiment.

FIG. 8.2 is an isometric view of an electrode assembly in the first contrasting embodiment.

FIG. 9.1 is an isometric view of an electrode plate in a second contrasting or comparing embodiment.

FIG. 9.2 is an isometric view of an electrode assembly in the second contrasting embodiment.

DETAILED DESCRIPTION

Figure 1:
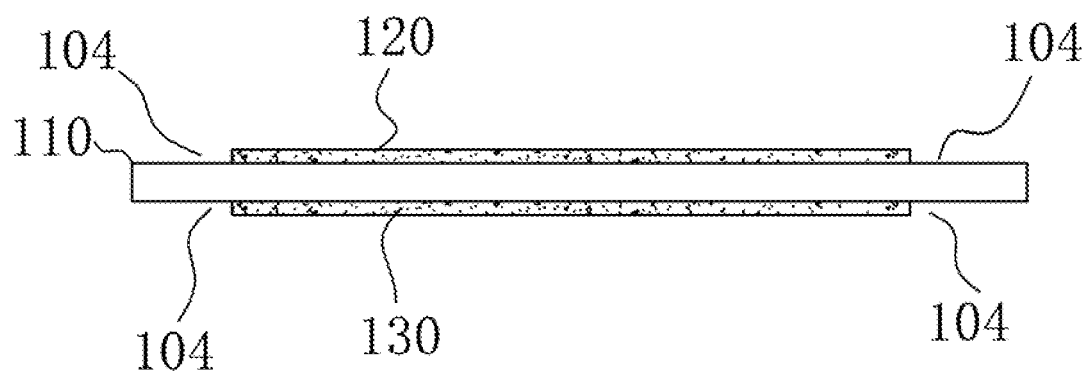
FIG. 1.1.1 is an isometric view of an electrode plate in a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series, and the like.

Referring to FIG. 1.1.1, a first embodiment is disclosed. FIG. 1.1.1 illustrates an electrode plate 100.

The electrode plate 100 includes a current collector 10, a first conductive connector 20, and an electrode tab 40.

The current collector 10 includes two opposite surfaces (not labeled). The first conductive connector 20 electrically connects the two opposite surfaces of the current collector 10. The electrode tab 40 is soldered to the first conductive connector 20.

The current collector 10 can be made of a metallic foil, such as a copper foil, an aluminum foil, or a nickel foil. Due to thickness requirements of the metallic foil, it is easy to break the current collector 10 if the electrode tab 40 is soldered directly to the current collector 10.

By applying the first conductive connector 20, the electrode tab 40 can be electrically fixed to the first conductive connector 20 and connected to the current collector 10 through the first conductive connector 20, therefore breakage of the current collector 10 can be avoided.

Referring to FIGS. 1.1.2 to 1.5.1 and 1.6.1, 1.7.1, a second embodiment is disclosed.

In FIG. 1.5.1, an electrode assembly 500 is illustrated. The electrode assembly 500 includes a cathode electrode plate, an anode electrode plate, and a separator disposed between the cathode electrode plate and the anode electrode plate. The cathode electrode plate, the anode electrode plate, and the separator can be coiled to make the electrode assembly 500. The electrode assembly 500 can be used to make a lithium ion battery.

Each of the cathode electrode plate and the anode electrode plate can be an electrode plate 100.

The electrode plate 100 can include a current collector 10, a first conductive connector 20, an electrode tab 40, and two electrode active substance layers 50.

Referring to FIG. 1.2, the current collector 10 can include an insulating layer 110, a first conductive layer 120, and a second conductive layer 130.

The insulating layer 110 includes two opposite side surfaces (not labeled). The first conductive layer 120 and the second conductive layer 130 are arranged on opposite side surfaces of the insulating layer 110.

The two electrode active substance layers 50 coat the first conductive layer 120 and the second conductive layer 130. The first conductive connector 20 electrically connects the first conductive layer 120 and the second conductive layer 130.

The electrode tab 40 is electrically connected to the current collector 10.

In one embodiment, the current collector 10 can be a composite current collector. To be specific, the current collector 10 can includes three layers. A middle layer is the insulating layer 110 made of high polymer insulating materials, and the first conductive layer 120 and the second conductive layer 130 can be metallic layers respectively arranged on opposite side surfaces of the insulating layer 110.

The composite current collector improves safety of batteries and reduces weight of the batteries.

However, because of the first conductive layer 120 and the second conductive layer 130 are respectively arranged on opposite side surfaces of the insulating layer 110, the first conductive layer 120 and the second conductive layer 130 are not electrically connected. When the electrode tab 40 is electrically connected to the current collector 10, the electrode tab 40 can electrically connect to only one of the first conductive layer 120 and the second conductive layer 130, electrons in the other layer, either layer 120 or layer 130, cannot flow through the electrode tab 40.

By applying electrical connections to the first conductive connector 20, the first conductive layer 120 and the second conductive layer 130, electrons in both the first conductive layer 120 and the second conductive layer 130 can flow through the electrode tab 40 when the electrode tab 40 is connected to any one of the first conductive connector 20, the first conductive layer 120, and the second conductive layer 130.

Referring to FIG. 1.3, the current collector 10 can include a first end 101, a middle portion 103, and a second end 102 along a length direction.

The second end 102 is opposite to the first end 101, and the middle portion 103 is located between the first end 101 and the second end 102.

The electrode tab 40 can be selectively connected to the first end 101, the second end 102, or the middle portion 103.

In FIG. 1.4, the first conductive connector 20 is located at the first end 101 and protrude out of a peripheral side of the current collector 10 along a width direction of the current collector 10, the first conductive connector 20 thus forming a protrusion 210. The electrode tab 40 is located at the first end 101 and soldered to the first conductive connector 20.

Correspondingly, when the electrode plate 100 is coiled to make the electrode assembly 500, the electrode plate 100 can be coiled along a predetermined direction and the first end 101 can be located in an inner side of the coiled electrode plate 100, the protrusion 210 of the first conductive connector 20 can be folded to the second end 102, and the protrusion 210 can be electrically coupled to the first conductive layer 120 or the second conductive layer 130.

When applying the composite current collector, the metallic layers (the first conductive layer 120 and the second conductive layer 130) can be thinner than existing current collectors made of metallic foils, which results in decrease of current carrying capability, increase of internal resistance of corresponding electrode assembly 500, and ohm polarization.

By applying the first conductive connector 20, the first conductive connector 20 electrically connects to the first conductive layer 120 and the second conductive layer 130, and when the electrode plate 100 is coiled to make the electrode assembly 500, the electrode plate 100 can be coiled along a predetermined direction and the protrusion 210 of the first conductive connector 20 can be folded to the second end 102. The protrusion 210 can be electrically coupled to the first conductive layer 120 or the second conductive layer 130. Alternatively, the electrode plate 100 can be folded in two half portions, the two half portions being in parallel with each other, thus reducing transmission path of electrons along the electrode plate 100 and internal resistance of corresponding electrode assembly 500.

In an embodiment, each of the first end 101 and the second end 102 of the current collector 10 includes a blank area 104. The blank area 104 is an area not coated with the electrode active substance layers 50, in other words, the blank area 104 is an area of the first conductive layer 120 or the second conductive layer 130 that not coated with the electrode active substance layers 50. The first conductive connector 20 electrically connects to opposite surfaces of the blank area 104 of the first end 101, and a protrusion 210 of the first conductive connector 20 electrically connects to the blank area 104 of the second end 102.

The first conductive connector 20 can be a bent metallic foil. Ends of the bent metallic foil are respectively coupled to the first conductive layer 120 and the second conductive layer 130 by soldering, therefore the two ends of the bendable metallic foil are also electrically connected to the first conductive layer 120 and the second conductive layer 130. In other embodiments, ends of the bent metallic foil can also be coupled to the first conductive layer 120 and the second conductive layer 130 through conductive resin.

The current collector 10 includes a first side 105 and a second side 106 opposite to the first side 105 along the width direction. A side of the first conductive connector 20 is aligned with the first side 105, and another side of the first conductive connector 10 protrudes out of the second side 106. A side of the first conductive connector 20 can also keep a predetermined distance away from the first side 105, only if the side of the first conductive connector 20 can be electrically connected to the first conductive layer 120 or the second conductive layer 130.

In one embodiment, the electrode plate 100 and a corresponding electrode assembly 500 can be made through following steps.

A. Formation of a current collector 10. The current collector 10 can be a composite current collector.

Referring to FIGS. 1.1.1, 1.1.2, 1.2, 1.3, and 1.5.1, a blank area 104 at the first end 101 of the current collector 10 is preserved. The blank area 104 at the first end 101 of the current collector 10 can be used to solder the electrode tab 40. When the electrode plate 100 is coiled along a predetermined direction, the blank area 104 of the first end 101 is located in an inner side of the corresponding electrode assembly 500. A blank area 104 is also preserved at the second end 102 of the current collector 10, when the electrode plate 100 is coiled along the predetermined direction, the blank area 104 of the second end 102 is located in an outer side of the corresponding electrode assembly 500 as an end portion of the electrode assembly 500.

B. Referring to FIGS. 1.3 and 1.4, Coating a metallic foil, such as an aluminum foil, on the blank area 104 of the first end 101 of the current collector 10. The aluminum foil is used as the first conductive connector 20 to electrically connect the first conductive layer 120 and the second conductive layer 130 of the current collector 10. A side of the aluminum foil protrudes out of one side of the current collector 10 along a width direction of the current collector 10.

Referring also to FIG. 1.5.1, in one embodiment, when coated on the blank area 104, a length of the aluminum foil along a length direction of the current collector 10 is within a range of 0.5 mm to (11b–0.5 mm), wherein 11b represents a length of the blank area 104 of the first end 101. A length 11c of the blank area 104 of the second end 102 can be equal to 11b.

A length 13a of a protrusion of the aluminum foil along a length direction of the current collector 10 is within a range of (151a/2+0.5 mm) to (151a/2+11a), wherein 151a represents a predetermined thickness of the electrode assembly 500, and 11a represents a width of the electrode plate 100.

C. Soldering the aluminum foil to the current collector 10.

D. Soldering the electrode tab 40 to the aluminum foil, and applying an insulating layer 60 as a coating on the aluminum foil, the insulating layer 60 can also be an insulating rubber tape. Soldering spots 70 can spread along the width direction of the current collector 10.

A width 14b of the insulating layer 60 is greater than 151a/2.

A length 14c of the insulating layer 60 can be equal to the width 11a of the electrode plate 100.

The width 14b of the insulating layer 60 is also within a range of (151a/2+0.5 mm) to (151a/2+11a).

An electrode plate 100 can be made through the steps A to D.

E. Formation of the electrode assembly 500. The electrode assembly 500 includes a cathode electrode plate, an anode electrode plate, and a separator (not shown) disposed between the cathode electrode plate and the anode electrode plate. The cathode electrode plate, the anode electrode plate, and the separator can be coiled to make the electrode assembly 500. The cathode electrode plate is an electrode plate 100 made through the steps A to D, and the anode electrode plate is a copper foil. The separator is made of insulating materials.

In one embodiment, the electrode assembly 500 can be made through following steps.

E1. Formation of the Cathode Electrode Plate.

Preparing a composite current collector including an insulating layer made of polyethylene terephthalate (PET) and two conductive layers made of aluminum foil. A thickness of the insulating layer can be 12 um, and a thickness of the aluminum foil can be 1 um.

Mixing cathode electrode active substances of lithium cobalt oxides (LiCoO2), conductive carbon black, polyvinylidene difluoride (PVDF) by a weight ratio of 97.5:1.0:1.5. Adding N-methylpyrrolidone (NMP) as solvent to the mixture of the cathode electrode active substances to make slurry having a solid content of 0.75.

Stirring the slurry evenly and applying the slurry as a coating to the two conductive layers of composite current collector. Preserving a blank area 104 at opposite ends of each of the two conductive layers, a length of the blank area 104 can be 40 mm, and a width of the composite current collector can be 75 mm.

Cutting an aluminum foil having a length of 60 mm, a width 13a of 110 mm, and a thickness of 10 um as a first conductive connector 20, folding the aluminum foil in half along a length direction and applying this aluminum foil as a coating to an end of the composite current collector. The aluminum foil can be soldered to the composite current collector (as shown in FIG. 1.1.2). After being folded in half, the aluminum foil has a length 13b of 30 mm.

Soldering an electrode tab 40 to the first conductive connector 20 and coating an insulating layer 60 having a width of 3 mm onto a boundary location of the first conductive connector 20 and the composite current collector (as shown in FIG. 1.4).

E2. Formation of the Anode Electrode Plate.

Preparing an Anode Current Collector Made of Copper Foil.

Mixing anode electrode active substances of silicon carbide, conductive carbon black, styrene-butadiene rubber (SBR) by a weight ratio of 95:1:4. Adding deionized water as solvent to the mixture of the anode electrode active substances to make slurry having a solid content of 0.49.

Stirring the slurry evenly and coating the slurry on opposite surfaces of the anode current collector. Preserving a blank area 104 at two opposite ends of anode current collector, a length of the blank area 104 can be 50 mm.

E3. Formation of the Electrode Assembly 500.

Sequentially arranging the cathode electrode plate, the separator, and the anode electrode plate and coiling along a predetermined direction to obtain a bare electrode assembly (as shown in FIG. 1.5.1), and folding the protrusion of the first conductive connector 20 to an outer side of the nude electrode assembly and fixing the protrusion to end portion of the cathode electrode plate (as shown in FIGS. 1.6.1 and 1.7.1) with a tape, an electrode assembly 500 is thus formed.

The electrode assembly 500 can be filled with electrolyte for battery, encapsulated, and then formatted to be a battery.

Referring also to FIGS. 1.5.2, 1.6.2 and 1.7.2, a third embodiment is disclosed.

An electrode assembly 500 is illustrated. The electrode assembly 500 includes a cathode electrode plate, an anode electrode plate, and a separator disposed between the cathode electrode plate and the anode electrode plate. The cathode electrode plate, the anode electrode plate, and the separator can be coiled to make the electrode assembly 500. The electrode assembly 500 can be used to make a lithium ion battery.

In the third embodiment, the cathode electrode plate, the anode electrode plate, and the separator can be same as in the second embodiment. The difference is that, in a step E3 of the third embodiment, when sequentially arranging the cathode electrode plate, the separator, and the anode electrode plate and coiling along a predetermined direction to obtain a bare electrode assembly, the protrusion of the first conductive connector 20 is folded to an outer side of the bare electrode assembly and fixed to an end portion of the cathode anode plate.

Correspondingly, the electrode assembly 500 can be made through following steps.

E1. Formation of the Cathode Electrode Plate.

Preparing a composite current collector including an insulating layer made of Polyethylene terephthalate (PET) and two conductive layers made of aluminum foil. A thickness of the insulating layer can be 12 um, and a thickness of the aluminum foil can be 1 um.

Mixing cathode electrode active substances of lithium cobalt oxides (LiCoO2), conductive carbon black, polyvinylidene difluoride (PVDF) by a weight ratio of 97.5:1.0:1.5. Adding N-methylpyrrolidone (NMP) as solvent to the mixture of the cathode electrode active substances to make slurry having a solid content of 0.75.

Stirring the slurry evenly and coating the slurry onto the two conductive layers of composite current collector. Preserving a blank area 104 at two opposite ends of each of the two conductive layers, a length of the blank area 104 can be 40 mm, and a width of the composite current collector can be 75 mm.

Cutting an aluminum foil having a length of 60 mm, a width 13a of 110 mm, and a thickness of 10 um as a first conductive connector 20, folding the aluminum foil in half along a length direction and coating this aluminum foil onto an end of the composite current collector. The aluminum foil can be soldered to the composite current collector (as shown in FIG. 1.1.2). After being folded in half, the aluminum foil has a length 13b of 30 mm.

Soldering an electrode tab 40 to the first conductive connector 20 and coating an insulating layer 60 having a width of 3 mm onto a boundary location of the first conductive connector 20 and the composite current collector (as shown in FIG. 1.4).

E2. Formation of the Anode Electrode Plate.

Preparing an Anode Current Collector Made of Copper Foil.

Mixing anode electrode active substances of silicon carbide, conductive carbon black, styrene-butadiene rubber (SBR) by a weight ratio of 95:1:4. Adding deionized water as solvent to the mixture of the anode electrode active substances to make slurry having a solid content of 0.49.

Stirring the slurry evenly and coating the slurry onto two opposite surfaces of the anode current collector. Preserving a blank area 104 at two opposite ends of anode current collector, a length of the blank area 104 can be 50 mm.

E3. Formation of the Electrode Assembly 500.

Sequentially arranging the cathode electrode plate, the separator, and the anode electrode plate and coiling along a predetermined direction to obtain a bare electrode assembly (as shown in FIG. 1.5.2), and folding the protrusion of the first conductive connector 20 to an outer side of the bare electrode assembly and fixing the protrusion to end portion of the anode electrode plate (as shown in FIGS. 1.6.2 and 1.7.2) with a tape, an electrode assembly 500 is thus formed.

The electrode assembly 500 can be filled with electrolyte for battery, encapsulated, and then formatted to be a battery.

Referring also to FIGS. 2.1 to 2.6, a fourth embodiment is disclosed.

An electrode assembly 500 is illustrated. The electrode assembly 500 includes a cathode electrode plate, an anode electrode plate, and a separator disposed between the cathode electrode plate and the anode electrode plate. The cathode electrode plate, the anode electrode plate, and the separator can be coiled to make the electrode assembly 500. The electrode assembly 500 can be used to make a lithium ion battery.

In the fourth embodiment, the cathode electrode plate, the anode electrode plate, and the separator can be same as in the second embodiment. The difference is that, in the fourth embodiment, the electrode plate 100 further includes a second conductive connector 30.

The second conductive connector 30 is located at the second end 102 of the current connector 10 and electrically connects the two opposite surfaces of the current collector 10.

When the electrode plate 100 is coiled along a predetermined direction and the first end 101 is located in an inner side, the second end 102 is located in an outer side, a protrusion 210 of the first conductive connector 20 is folded to the second end 102 and is electrically coupled to the second conductive connector 30.

In one embodiment, each of the first end 101 and the second end 102 of the current collector 10 includes a blank area 104 not coated with the electrode active substance layers 50.

The first conductive connector 20 electrically connects two opposite surfaces of the blank area 104 of the first end 101, and the second conductive connector 30 electrically connects to the blank area 104 of the second end 102.

The first conductive connector 20 can be a bent metallic foil, two ends of the bent metallic foil are respectively coupled to the first conductive layer 120 and the second conductive layer 130 by soldering. Thereby, the two ends of the bendable metallic foil are also electrically connected to the first conductive layer 120 and the second conductive layer 130. In other embodiments, the two ends of the bent metallic foil can also respectively be coupled to the first conductive layer 120 and the second conductive layer 130 through conductive resin.

The second conductive connector 30 can be a bent metallic foil and two ends of the bent metallic foil can also respectively be coupled to the first conductive layer 120 and the second conductive layer 130 in a same way as the first conductive connector 20.

Correspondingly, the electrode assembly 500 can be made through following steps.

A. Formation of a current collector 10. The current collector 10 can be a composite current collector.

Referring to FIGS. 1.1.2 and 1.2, preserving a blank area 104 at the first end 101 of the current collector 10. The blank area 104 at the first end 101 of the current collector 10 can be used to solder the electrode tab 40. When the electrode plate 100 is coiled along a predetermined direction, the blank area 104 of the first end 101 is located in an inner side of the corresponding electrode assembly 500. A blank area 104 is also preserved at the second end 102 of the current collector 10, when the electrode plate 100 is coiled along the predetermined direction, the blank area 104 of the second end 102 is located in an outer side of the corresponding electrode assembly 500 as an end portion of the electrode assembly 500.

B. Referring to FIGS. 2.1 to 2.3, coating a metallic foil, such as an aluminum foil, onto the blank area 104 of the first end 101 of the current collector 10. The aluminum foil is used as the first conductive connector 20 to electrically connect the first conductive layer 120 and the second conductive layer 130 of the current collector 10. A side of the aluminum foil protrudes out of one side of the current collector 10 along a width direction of the current collector 10.

Referring also to FIG. 1.5.1, in one embodiment, when coated onto the blank area 104, a length of the aluminum foil along a length direction of the current collector 10 is within a range of 0.5 mm to (11*b*−0.5 mm). The 11*b* represents a length of the blank area 104 of the first end 101.

A length 13*a* of a protrusion of the aluminum foil along a length direction of the current collector 10 is within a range of (151*a*/2+0.5 mm) to (151*a*/2+11*a*). The 151*a* represents a predetermined thickness of the electrode assembly 500, and the 11*a* represents a width of the electrode plate 100.

B1. Coating a metallic foil, such as an aluminum foil, onto the blank area 104 of the second end 102 of the current collector 10. This aluminum foil is used as the second conductive connector 30 to electrically connect the first conductive layer 120 and the second conductive layer 130 of the current collector 10.

Two opposite sides of the second conductive connector 30 can be respectively aligned with the first side 105 and the second side 106 of the current collector 10. One of two opposite sides of the second conductive connector 30 can also be aligned with the first side 105, and the other one of the two opposite sides of the second conductive connector 30 protrudes out of the second side 106. One of two opposite sides of the second conductive connector 30 can also keep a certain distance away from the first side 105 or the second side 106.

C. Soldering the aluminum foils of the first conductive connector 20 and the second conductive connector 30 to the current collector 10.

D. Soldering the electrode tab 40 to the aluminum foil, and coating an insulating layer 60 onto the aluminum foil. The insulating layer 60 can also be an insulating rubber tape 80. Soldering spots 70 can spread along the width direction of the current collector 10.

A width 14*b* of the insulating layer 60 is greater than 151*a*/2.

A length 14*c* of the insulating layer 60 can be equal to the width 11*a* of the electrode plate 100.

The width 14*b* of the insulating layer 60 is also within a range of (151*a*/2+0.5 mm) to (151*a*/2+11*a*).

An electrode plate 100 can be made through the steps A to D.

E. Formation of the electrode assembly 500. The electrode assembly 500 includes a cathode electrode plate, an anode electrode plate, and a separator (not shown) disposed between the cathode electrode plate and the anode electrode plate. The cathode electrode plate, the anode electrode plate, and the separator can be coiled to make the electrode assembly 500. The cathode electrode plate is an electrode plate 100 made through the steps A to D, and the anode electrode plate is a copper foil. The separator is made of insulating materials.

In one embodiment, the electrode assembly 500 can be made through following steps.

E1. Formation of the Cathode Electrode Plate.

Preparing a composite current collector including an insulating layer made of Polyethylene terephthalate (PET) and two conductive layers made of aluminum foil. A thickness of the insulating layer can be 12 um, and a thickness of the aluminum foil can be 1 um.

Mixing cathode electrode active substances of lithium cobalt oxides (LiCoO2), conductive carbon black, polyvinylidene difluoride (PVDF) by a weight ratio of 97.5:1.0:1.5. Adding N-methylpyrrolidone (NMP) as solvent to the mixture of the cathode electrode active substances to make slurry having a solid content of 0.75.

Stirring the slurry evenly and coating the slurry onto the two conductive layers of composite current collector. Preserving a blank area 104 at two opposite ends of each of the two conductive layers, a length of the blank area 104 can be 40 mm, and a width of the composite current collector can be 75 mm.

Cutting an aluminum foil having a length of 60 mm, a width of 110 mm, and a thickness of 10 um as a first conductive connector 20, folding the aluminum foil in half along a length direction and coating this aluminum foil onto the first end 101 of the composite current collector. The aluminum foil can be soldered to the composite current collector (as shown in FIGS. 2.2 and 2.3). After being folded in half, the aluminum foil has a length of 30 mm.

Cutting an aluminum foil having a length of 60 mm, a width of 75 mm, and a thickness of 10 um as a second conductive connector 30, folding the aluminum foil in half along a length direction and coating this aluminum foil to the second end 106 of the composite current collector. The aluminum foil can be soldered to the composite current collector (as shown in FIGS. 2.2 and 2.3). After being folded in half, the aluminum foil has a length of 3 0 mm.

Soldering an electrode tab 40 to the first conductive connector 20 and coating an insulating layer 60 having a width of 3 mm onto a boundary location of the first conductive connector 20 and the composite current collector (as shown in FIG. 2.3).

E2. Formation of the Anode Electrode Plate.

Preparing an Anode Current Collector Made of Copper Foil.

Mixing anode electrode active substances of silicon carbide, conductive carbon black, and styrene-butadiene rubber (SBR) by a weight ratio of 95:1:4. Adding deionized water as solvent to the mixture of the anode electrode active substances to make slurry having a solid content of 0.49.

Stirring the slurry evenly and coating the slurry onto two opposite surfaces of the anode current collector. Preserving a blank area 104 at two opposite ends of anode current collector, a length of the blank area 104 can be 50 mm.

E3. Formation of the Electrode Assembly 500.

Sequentially arranging the cathode electrode plate, the separator, and the anode electrode plate and coiling along a predetermined direction to obtain a bare electrode assembly (as shown in FIG. 2.4), and folding the protrusion of the first conductive connector 20 to an outer side of the nude electrode assembly and fixing the protrusion 210 of the first conductive connector 20 to the second conductive connector 30 (as shown in FIGS. 2.5 and 2.6) with an insulating layer 60, and an electrode assembly 500 is thus formed.

The electrode assembly 500 can be filled with electrolyte for battery, encapsulated, and then formatted to be a battery.

Referring also to FIGS. 3.1 to 3.4, a fifth embodiment is disclosed.

An electrode assembly 500 is illustrated. The electrode assembly 500 includes a cathode electrode plate, an anode electrode plate, and a separator disposed between the cathode electrode plate and the anode electrode plate. The cathode electrode plate, the anode electrode plate, and the separator can be coiled to make the electrode assembly 500. The electrode assembly 500 can be used to make a Lithium ion battery.

In the fifth embodiment, the cathode electrode plate, the anode electrode plate, and the separator can be same as in the fourth embodiment. The difference is that, in the fifth embodiment, the second conductive connector 30 protrudes out of a peripheral side of the current collector 10 along a width direction of the current collector 10 and forms a protrusion 310.

The protrusion 310 of the second conductive connector 30 is located to correspond to a protrusion 210 of the first conductive connector 20, and the protrusion 310 of the second conductive connector is configured to attach to the protrusion 210 of the first conductive connector 20.

The second conductive connector 30 is located at the second end 102 of the current connector 10 and electrically connects the two opposite surfaces of the current collector 10.

When the electrode plate 100 is coiled along a predetermined direction and the first end 101 is located in an inner side, the second end 102 is located in an outer side, a protrusion 210 of the first conductive connector 20 is folded to the second end 102 and electrically coupled to the second conductive connector 30.

In one embodiment, each of the first end 101 and the second end 102 of the current collector 10 includes a blank area 104 not coated with the electrode active substance layers 50.

The first conductive connector 20 electrically connects two opposite surfaces of the blank area 104 of the first end 101, and the second conductive connector 30 electrically connects to the blank area 104 of the second end 102.

The first conductive connector 20 can be a bent metallic foil, two ends of the bent metallic foil are respectively coupled to the first conductive layer 120 and the second conductive layer 130 by soldering, thereby the two ends of the bendable metallic foil are also electrically connected to the first conductive layer 120 and the second conductive layer 130. In other embodiments, the two ends of the bendable metallic foil can also respectively be coupled to the first conductive layer 120 and the second conductive layer 130 through conductive resin.

The second conductive connector 30 can be a bent metallic foil and two ends of the bent metallic foil can also respectively be coupled to the first conductive layer 120 and the second conductive layer 130 in a same way as the first conductive connector 20.

Correspondingly, the electrode assembly 500 can be made through following steps.

A. Formation of a current collector 10. The current collector 10 can be a composite current collector.

Referring also to FIG. 3.1, preserving a blank area 104 at the first end 101 of the current collector 10. The blank area 104 at the first end 101 of the current collector 10 can be used to solder the electrode tab 40. When the electrode plate 100 is coiled along a predetermined direction, the blank area 104 of the first end 101 is located in an inner side of the corresponding electrode assembly 500. A blank area 104 is also preserved at the second end 102 of the current collector 10, so that when the electrode plate 100 is coiled along the predetermined direction, the blank area 104 of the second end 102 is located in an outer side of the corresponding electrode assembly 500 as an end portion of the electrode assembly 500.

B. Referring to FIG. 3.1, coating a metallic foil, such as an aluminum foil, onto the blank area 104 of the first end 101 of the current collector 10. The aluminum foil is used as the first conductive connector 20 to electrically connect the first conductive layer 120 and the second conductive layer 130 of the current collector 10. A side of the aluminum foil protrudes out of one side of the current collector 10 along a width direction of the current collector 10.

In one embodiment, when coated onto the blank area 104, a length of the aluminum foil along a length direction of the current collector 10 is within a range of 0.5 mm to ($11b$–0.5 mm). The $11b$ represents a length of the blank area 104 of the first end 101.

A length $13a$ of a protrusion of the aluminum foil along a length direction of the current collector 10 is within a range of ($151a/2$+0.5 mm) to ($151a/2$+$11a$). The $151a$ represents a predetermined thickness of the electrode assembly 500, and the $11a$ represents a width of the electrode plate 100.

B1. Coating a metallic foil, such as an aluminum foil, onto the blank area 104 of the second end 102 of the current collector 10. This aluminum foil is used as the second conductive connector 30 to electrically connect the first conductive layer 120 and the second conductive layer 130 of the current collector 10.

One of two opposite sides of the second conductive connector 30 can be aligned with the first side 105, and the other one of the two opposite sides of the second conductive connector 30 can protrude out of the second side 106. The size of the second conductive connector 30 can be same as that of the first conductive connector 20.

C. Soldering the aluminum foils of the first conductive connector 20 and the second conductive connector 30 to the current collector 10.

D. Soldering the electrode tab 40 to the aluminum foil, and coating an insulating layer 60 onto the aluminum foil, the insulating layer 60 can also be an insulating rubber tape 80. Soldering spots 70 can spread along the width direction of the current collector 10.

A width $14b$ of the insulating layer 60 is greater than $151a/2$.

A length $14c$ of the insulating layer 60 can be equal to the width $11a$ of the electrode plate 100.

The width $14b$ of the insulating layer 60 is also within a range of ($151a/2$+0.5 mm) to ($151a/2$+$11a$).

An electrode plate 100 can be made through the steps A to D.

E. Formation of the electrode assembly 500. The electrode assembly 500 includes a cathode electrode plate, an anode electrode plate, and a separator (not shown) disposed between the cathode electrode plate and the anode electrode plate. The cathode electrode plate, the anode electrode plate, and the separator can be coiled to make the electrode assembly 500. The cathode electrode plate is an electrode plate 100 made through the steps A to D, and the anode electrode plate is a copper foil. The separator is made of insulating materials.

In one embodiment, the electrode assembly 500 can be made through following steps.

E1. Formation of the Cathode Electrode Plate.

Preparing a composite current collector including an insulating layer made of Polyethylene terephthalate (PET) and two conductive layers made of aluminum foil. A thickness of the insulating layer can be 12 um, and a thickness of the aluminum foil can be 1 um.

Mixing cathode electrode active substances of lithium cobalt oxides (LiCoO2), conductive carbon black, and polyvinylidene difluoride (PVDF) by a weight ratio of 97.5:1.0:1.5. Adding N-methylpyrrolidone (NMP) as solvent to the mixture of the cathode electrode active substances to make slurry having a solid content of 0.75.

Stirring the slurry evenly and coating the slurry onto the two conductive layers of composite current collector. Preserving a blank area 104 at two opposite ends of each of the two conductive layers, a length of the blank area 104 can be 40 mm, and a width of the composite current collector can be 75 mm.

Cutting an aluminum foil having a length of 60 mm, a width of 110 mm, and a thickness of 10 um as a first conductive connector 20, folding the aluminum foil in half along a length direction and coating this aluminum foil onto the first end 101 of the composite current collector. The aluminum foil can be soldered to the composite current collector (as shown in FIG. 3.1). After being folded in half, the aluminum foil has a length of 30 mm.

Cutting an aluminum foil having a length of 60 mm, a width of 110 mm, and a thickness of 10 um as a second conductive connector 30, folding the aluminum foil in half along a length direction and coating this aluminum foil to the second end 106 of the composite current collector. The aluminum foil can be soldered to the composite current collector. After being folded in half, the aluminum foil has a length of 30 mm.

Soldering an electrode tab 40 to the first conductive connector 20 and coating an insulating layer 60 having a width of 3 mm onto a boundary location of the first conductive connector 20 and the composite current collector (as shown in FIG. 3.1).

E2. Formation of the Anode Electrode Plate.

Preparing an Anode Current Collector Made of Copper Foil.

Mixing anode electrode active substances of silicon carbide, conductive carbon black, and styrene-butadiene rubber (SBR) by a weight ratio of 95:1:4. Adding deionized water as solvent to the mixture of the anode electrode active substances to make slurry having a solid content of 0.49.

Stirring the slurry evenly and coating the slurry onto two opposite surfaces of the anode current collector. Preserving a blank area 104 at two opposite ends of anode current collector, a length of the blank area 104 can be 50 mm.

E3. Formation of the Electrode Assembly 500.

Sequentially arranging the cathode electrode plate, the separator, and the anode electrode plate and coiling along a predetermined direction to obtain a bare electrode assembly (as shown in FIG. 3.2), the protrusion 210 of the first conductive connector 20 and the protrusion 310 of the second conductive connector 30 match with each other, and folding the protrusion 210 and the protrusion 310 to an outer side of the bare electrode assembly, fixing the protrusion 210 and the protrusion 310 (as shown in FIGS. 3.3 and 3.4) with an insulating layer 60, and an electrode assembly 500 is thereby formed.

The electrode assembly 500 can be filled with electrolyte for battery, encapsulated, and then formatted to be a battery.

Figure 4:
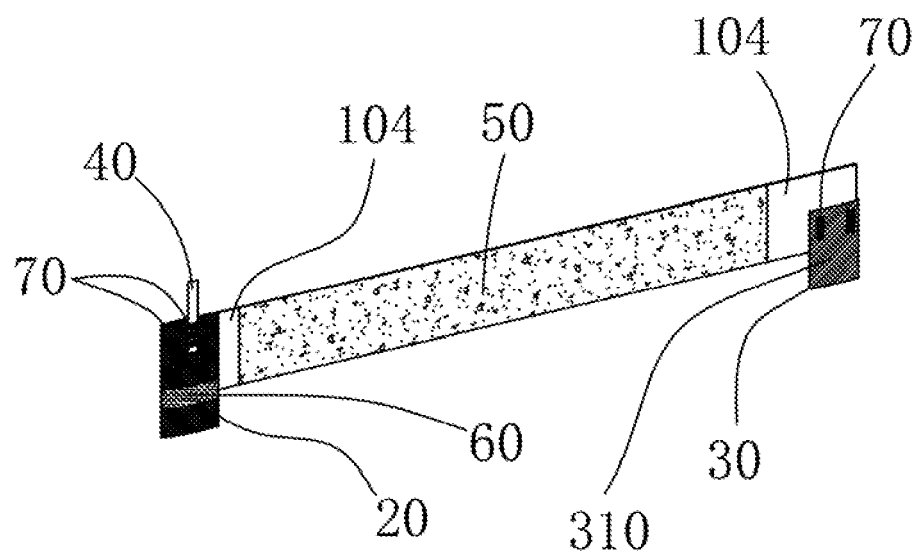
FIG. 4.1 is an isometric view of an electrode plate in a sixth embodiment.

Referring also to FIGS. 4.1 to 4.2, a sixth embodiment is disclosed.

In the sixth embodiment, the cathode electrode plate, the anode electrode plate, and the separator can be same as in the fifth embodiment. The difference is that, in the sixth embodiment, a length of the second conductive connector 30 along the width direction is less than a length of the first conductive connector 20 along the width direction, and a distance between a side of the second conductive connector 30 and the first side 105 is larger than a distance between a corresponding side of the first conductive connector 20 and the first side 105.

In one embodiment, the electrode assembly 500 can be made through following steps.

E1. Formation of the Cathode Electrode Plate.

Preparing a composite current collector including an insulating layer made of Polyethylene terephthalate (PET) and two conductive layers made of aluminum foil. A thickness of the insulating layer can be 12 um, and a thickness of the aluminum foil can be 1 um.

Mixing cathode electrode active substances of lithium cobalt oxides (LiCoO2), conductive carbon black, and polyvinylidene difluoride (PVDF) by a weight ratio of 97.5:1.0:1.5. Adding N-methylpyrrolidone (NMP) as solvent to the mixture of the cathode electrode active substances to make slurry having a solid content of 0.75.

Stirring the slurry evenly and coating the slurry onto the two conductive layers of composite current collector. Preserving a blank area 104 at two opposite ends of each of the two conductive layers, a length of the blank area 104 can be 40 mm, and a width of the composite current collector can be 75 mm.

Cutting an aluminum foil having a length of 60 mm, a width of 110 mm, and a thickness of 10 um as a first conductive connector 20, folding the aluminum foil in half along a length direction and coating this aluminum foil onto the first end 101 of the composite current collector. The aluminum foil can be soldered to the composite current collector (as shown in FIG. 2.2). After being folded in half, the aluminum foil has a length of 30 mm.

Cutting an aluminum foil having a length of 60 mm, a width of 70 mm, and a thickness of 10 um as a second conductive connector 30, folding the aluminum foil in half along a length direction and coating this aluminum foil to the second end 106 of the composite current collector. The aluminum foil can be soldered to the composite current collector. After being folded in halt the aluminum foil has a length of 30 mm. A protrusion 310 of the second conductive connector 30 can be 35 mm.

Soldering an electrode tab 40 to the first conductive connector 20 and coating an insulating layer 60 having a width of 3 mm onto a boundary location of the first conductive connector 20 and the composite current collector (as shown in FIG. 4.1).

E2. Formation of the Anode Electrode Plate.

Preparing an Anode Current Collector Made of Copper Foil.

Mixing anode electrode active substances of silicon carbide, conductive carbon black, and styrene-butadiene rubber (SBR) by a weight ratio of 95:1:4. Adding deionized water as solvent to the mixture of the anode electrode active substances to make slurry having a solid content of 0.49.

Stirring the slurry evenly and coating the slurry onto two opposite surfaces of the anode current collector. Preserving a blank area 104 at two opposite ends of anode current collector, a length of the blank area 104 can be 50 mm.

E3. Formation of the Electrode Assembly 500.

Sequentially arranging the cathode electrode plate, the separator, and the anode electrode plate and coiling along a predetermined direction to obtain a bare electrode assembly, the protrusion 210 of the first conductive connector 20 and the protrusion 310 of the second conductive connector 30 match with each other, and folding the protrusion 210 and the protrusion 310 to an outer side of the nude electrode assembly, fixing the protrusion 210 and the protrusion 310 with an insulating layer 60 (as shown in FIG. 4.2), and an electrode assembly 500 is formed.

The electrode assembly 500 can be filled with electrolyte for battery, encapsulated, and then formatted to be a battery.

Referring also to FIGS. 5.1 to 5.2, a seventh embodiment is disclosed.

In the seventh embodiment, the cathode electrode plate, the anode electrode plate, and the separator can be same as in the fifth embodiment. The difference is that, in the seventh embodiment, the electrode tab 40 is located at the second end 102 of the current collector 10. Specifically, when the second conductive connector 30 is coated onto the second end 102, the electrode tab 40 can be soldered to the second conductive connector 30.

In one embodiment, the electrode assembly 500 can be made through following steps.

E1. Formation of the Cathode Electrode Plate.

Preparing a composite current collector including an insulating layer made of Polyethylene terephthalate (PET) and two conductive layers made of aluminum foil. A thickness of the insulating layer can be 12 um, and a thickness of the aluminum foil can be 1 um.

Mixing cathode electrode active substances of lithium cobalt oxides (LiCoO2), conductive carbon black, and polyvinylidene difluoride (PVDF) by a weight ratio of 97.5:1.0:1.5. Adding N-methylpyrrolidone (NMP) as solvent to the mixture of the cathode electrode active substances to make slurry having a solid content of 0.75.

Stirring the slurry evenly and coating the slurry onto the two conductive layers of composite current collector. Preserving a blank area 104 at two opposite ends of each of the two conductive layers, a length of the blank area 104 can be 40 mm, and a width of the composite current collector can be 75 mm.

Cutting an aluminum foil having a length of 60 mm, a width of 110 mm, and a thickness of 10 um as a first conductive connector 20, folding the aluminum foil in half along a length direction and coating this aluminum foil onto the first end 101 of the composite current collector. The aluminum foil can be soldered to the composite current collector. After being folded in half, the aluminum foil has a length of 30 mm.

Cutting an aluminum foil having a length of 60 mm, a width of 70 mm, and a thickness of 10 um as a second conductive connector 30, folding the aluminum foil in half along a length direction and coating this aluminum foil onto the second end 106 of the composite current collector. The aluminum foil can be soldered to the composite current collector. After being folded in half, the aluminum foil has a length of 30 mm. A protrusion 310 of the second conductive connector 30 can be 35 mm.

Soldering an electrode tab 40 to the second conductive connector 30 and coating an insulating layer 60 having a width of 3 mm onto a boundary location of the first conductive connector 20 and the composite current collector (as shown in FIG. 5.1).

E2. Formation of the Anode Electrode Plate.

Preparing an Anode Current Collector Made of Copper Foil.

Mixing anode electrode active substances of silicon carbide, conductive carbon black, and styrene-butadiene rubber (SBR) by a weight ratio of 95:1:4. Adding deionized water as solvent to the mixture of the anode electrode active substances to make slurry having a solid content of 0.49.

Stirring the slurry evenly and coating the slurry onto two opposite surfaces of the anode current collector. Preserving a blank area 104 at two opposite ends of anode current collector, a length of the blank area 104 can be 50 mm.

E3. Formation of the Electrode Assembly 500.

Sequentially arranging the cathode electrode plate, the separator, and the anode electrode plate and coiling along a predetermined direction to obtain a bare electrode assembly, the protrusion 210 of the first conductive connector 20 and the protrusion 310 of the second conductive connector 30 match with each other, and folding the protrusion 210 and the protrusion 310 to an outer side of the nude electrode assembly, fixing the protrusion 210 and the protrusion 310 with an insulating layer 60 (as shown in FIG. 5.2), and an electrode assembly 500 is formed.

The electrode assembly 500 can be filled with electrolyte for battery, encapsulated, and then formatted to be a battery.

Referring also to FIGS. 6.1 to 6.2, an eighth embodiment is disclosed.

In the eighth embodiment, the cathode electrode plate, the anode electrode plate, and the separator can be same as in the seventh embodiment. The difference is that, in the eighth embodiment, the electrode tab 40 is located at the middle portion 103 of the current collector 10. Specifically, a blank area 104 can be preserved in the middle portion of the current collector 10, or when the current collector is formatted, the electrode substance layer 50 in the position of the electrode tab 40 can be removed to expose the first conductive layer 120 or the second conductive layer 130.

In one embodiment, the electrode assembly 500 can be made through following steps.

E1. Formation of the Cathode Electrode Plate.

Preparing a composite current collector including an insulating layer made of Polyethylene terephthalate (PET) and two conductive layers made of aluminum foil. A thickness of the insulating layer can be 12 um, and a thickness of the aluminum foil can be 1 um.

Mixing cathode electrode active substances of lithium cobalt oxides (LiCoO2), conductive carbon black, and polyvinylidene difluoride (PVDF) by a weight ratio of 97.5:1.0:1.5. Adding N-methylpyrrolidone (NMP) as solvent to the mixture of the cathode electrode active substances to make slurry having a solid content of 0.75.

Stirring the slurry evenly and coating the slurry onto the two conductive layers of composite current collector. Preserving a blank area 104 at two opposite ends of each of the two conductive layers and the middle portion 103 of one of the two conductive layers, a length of the blank area 104 can be 40 mm, and a width of the composite current collector can be 75 mm.

Cutting an aluminum foil having a length of 60 mm, a width of 110 mm, and a thickness of 10 um as a first conductive connector 20, folding the aluminum foil in half along a length direction and coating this aluminum foil to the first end 101 of the composite current collector. The aluminum foil can be soldered to the composite current collector. After being folded in half, the aluminum foil has a length of 30 mm.

Cutting an aluminum foil having a length of 60 mm, a width of 110 mm, and a thickness of 10 um as a second conductive connector 30, folding the aluminum foil in half along a length direction and coating this aluminum foil onto the second end 106 of the composite current collector. The aluminum foil can be soldered to the composite current collector. After being folded in half, the aluminum foil has a length of 30 mm. A protrusion 310 of the second conductive connector 30 can be 35 mm.

Soldering an electrode tab 40 to the blank area 104 in the middle portion 103, and coating an insulating layer 60 having a width of 3 mm onto a boundary location of the first conductive connector 20 and the composite current collector (as shown in FIG. 6.1).

E2. Formation of the Anode Electrode Plate.

Preparing an Anode Current Collector Made of Copper Foil.

Mixing anode electrode active substances of silicon carbide, conductive carbon black, and styrene-butadiene rubber (SBR) by a weight ratio of 95:1:4. Adding deionized water as solvent to the mixture of the anode electrode active substances to make slurry having a solid content of 0.49.

Stirring the slurry evenly and coating the slurry onto two opposite surfaces of the anode current collector. Preserving a blank area 104 at two opposite ends of anode current collector, a length of the blank area 104 can be 50 mm.

E3. Formation of the Electrode Assembly 500.

Sequentially arranging the cathode electrode plate, the separator, and the anode electrode plate and coiling along a predetermined direction to obtain a bare electrode assembly, the protrusion 210 of the first conductive connector 20 and the protrusion 310 of the second conductive connector 30 matching with each other, and folding the protrusion 210 and the protrusion 310 to an outer side of the nude electrode assembly, fixing the protrusion 210 and the protrusion 310 with an insulating layer 60 (as shown in FIG. 6.2), and an electrode assembly 500 is formed.

The electrode assembly 500 can be filled with electrolyte for battery, encapsulated, and then formatted to be a battery.

Referring also to FIGS. 7.1 to 7.2, a ninth embodiment is disclosed.

In the ninth embodiment, the cathode electrode plate, the anode electrode plate, and the separator can be same as in the fourth embodiment. The difference is that, in the ninth embodiment, a width of the first conductive connector 20 is substantially equal to a width of the blank 104 at the first end 101, and a width of the second conductive connector 30 is substantially equal to a width of the blank 104 at the second end 102.

When coated onto the current collector 10, two opposite sides of each of the first conductive connector 20 and the second conductive connector 30 are respectively aligned with the first side 105 and the second side 106 of the current collector 10.

Two electrode tabs 40 are respectively connected to the first conductive connector 20 and the second conductive connector 30.

In one embodiment, the electrode assembly 500 can be made through following steps.

E1. Formation of the Cathode Electrode Plate.

Preparing a composite current collector including an insulating layer made of Polyethylene terephthalate (PET) and two conductive layers made of aluminum foil. A thickness of the insulating layer can be 12 um, and a thickness of the aluminum foil can be 5um.

Mixing cathode electrode active substances of lithium cobalt oxides (LiCoO2), conductive carbon black, and polyvinylidene difluoride (PVDF) by a weight ratio of 97.5:1.0:1.5. Adding N-methylpyrrolidone (NMP) as solvent to the mixture of the cathode electrode active substances to make slurry having a solid content of 0.75.

Stirring the slurry evenly and coating the slurry onto the two conductive layers of composite current collector. Preserving a blank area 104 at two opposite ends of each of the two conductive layers and the middle portion 103 of one of the two conductive layers, a length of the blank area 104 can be 40 mm, and a width of the composite current collector can be 75 mm.

Cutting an aluminum foil having a length of 60 mm, a width of 75 mm, and a thickness of 10 um as a first conductive connector 20, folding the aluminum foil in half along a length direction and coating this aluminum foil onto the first end 101 of the composite current collector. The aluminum foil can be soldered to the composite current collector. After being folded in half, the aluminum foil has a length of 30 mm.

Cutting an aluminum foil having a length of 60 mm, a width of 75 mm, and a thickness of 10 um as a second conductive connector 30, folding the aluminum foil in half along a length direction and coating this aluminum foil onto the second end 106 of the composite current collector. The aluminum foil can be soldered to the composite current collector. After being folded in half, the aluminum foil has a length of 30 mm.

Respectively soldering two electrode tabs 40 to the first conductive connector 20 and the second conductive connector 30, and coating an insulating layer 60 having a width of 3 mm onto a boundary location of the first conductive connector 20 and the composite current collector (as shown in FIG. 7.1).

E2. Formation of the Anode Electrode Plate.

Preparing an Anode Current Collector Made of Copper Foil.

Mixing anode electrode active substances of silicon carbide, conductive carbon black, and styrene-butadiene rubber (SBR) by a weight ratio of 95:1:4. Adding deionized water as solvent to the mixture of the anode electrode active substances to make slurry having a solid content of 0.49.

Stirring the slurry evenly and coating the slurry onto two opposite surfaces of the anode current collector. Preserving a blank area 104 at two opposite ends of anode current collector, a length of the blank area 104 can be 50 mm.

E3. Formation of the Electrode Assembly 500.

Sequentially arranging the cathode electrode plate, the separator, and the anode electrode plate and coiling along a predetermined direction to obtain a bare electrode assembly, the electrode tabs 40 at the first conductive connector 20 and the second conductive connector 30 matching with each other, soldering the electrode tabs 40 to each other (as shown in FIG. 7.2), and an electrode assembly 500 is formed.

The electrode assembly 500 can be filled with electrolyte for battery, encapsulated, and then formatted to be a battery.

Figure 8:
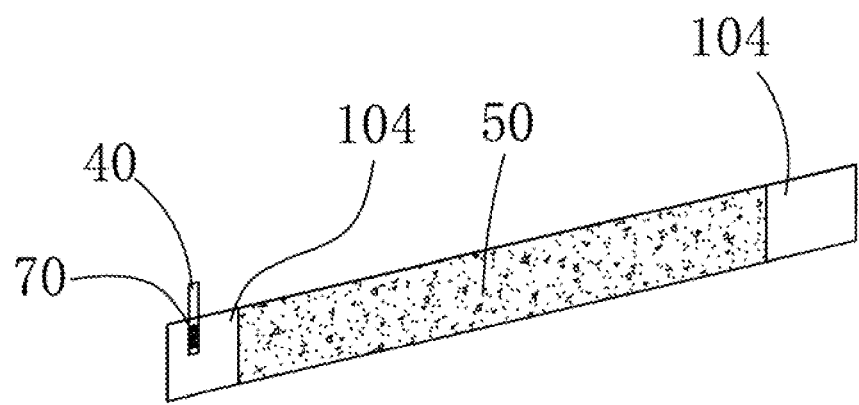
FIG. 8.1 is an isometric view of an electrode plate in a first contrasting or comparing embodiment.

Referring also to FIGS. 8.1 to 8.2, a first comparison or contrasting embodiment is disclosed. The first comparison embodiment is used to compare with the first to the ninth embodiments to assist in clarifying technical effects of the present disclosure, and is not an embodiment of the present disclosure.

In the first comparison, the cathode electrode plate, the anode electrode plate, and the separator are substantially same as in the fourth embodiment. The difference is that, in the first comparison embodiment, the cathode electrode plate does not include the first conductive connector 20 and the second conductive connector 30, and in the first comparison embodiment, the electrode tab 40 is soldered to the blank area 104 of the first end 101 of the current collector 10.

Correspondingly, the electrode assembly 500 can be made through following steps.

E1. Formation of the Cathode Electrode Plate.

Preparing a composite current collector including an insulating layer made of Polyethylene terephthalate (PET) and two conductive layers made of aluminum foil. A thickness of the insulating layer can be 12 um, and a thickness of the aluminum foil can be 1 um.

Mixing cathode electrode active substances of lithium cobalt oxides (LiCoO2), conductive carbon black, and polyvinylidene difluoride (PVDF) by a weight ratio of 97.5:1.0:1.5. Adding N-methylpyrrolidone (NMP) as solvent to the mixture of the cathode electrode active substances to make slurry having a solid content of 0.75.

Stirring the slurry evenly and coating the slurry onto the two conductive layers of composite current collector. Preserving a blank area 104 at two opposite ends of each of the two conductive layers and the middle portion 103 of one of the two conductive layers, a length of the blank area 104 can be 40 mm, and a width of the composite current collector can be 75 mm.

Soldering an electrode tab 40 to the blank area 104 of the first end 101 of the current collector 10 (as shown in FIG. 8.1).

E2. Formation of the Anode Electrode Plate.

Preparing an Anode Current Collector Made of Copper Foil.

Mixing anode electrode active substances of silicon carbide, conductive carbon black, and styrene-butadiene rubber (SBR) by a weight ratio of 95:1:4. Adding deionized water as solvent to the mixture of the anode electrode active substances to make slurry having a solid content of 0.49.

Stirring the slurry evenly and coating the slurry onto two opposite surfaces of the anode current collector. Preserving a blank area 104 at two opposite ends of the anode current collector, a length of the blank area 104 can be 50 mm.

E3. Formation of the Electrode Assembly 500.

Sequentially arranging the cathode electrode plate, the separator, and the anode electrode plate and coiling along a predetermined direction to obtain an electrode assembly 500 (as shown in FIG. 8.2).

The electrode assembly 500 can be filled with electrolyte for battery, encapsulated, and then formatted to be a battery.

Referring also to FIGS. 9.1 to 9.2, a second comparison embodiment is disclosed. The second comparison embodiment is used to compare with the first to the ninth embodiments to assist in clarifying technical effects of the present disclosure, and is not an embodiment of the present disclosure.

In the second comparison embodiment, the cathode electrode plate, the anode electrode plate, and the separator are substantially same as in the ninth embodiment. The difference is that, in the first comparison embodiment, the cathode electrode plate does not include the second conductive connector 30, and in the first comparison embodiment, the electrode tab 40 is soldered to the blank area 104 of the first end 101 of the current collector 10.

Correspondingly, the electrode assembly 500 can be made through following steps.

E1. Formation of the Cathode Electrode Plate.

Preparing a composite current collector including an insulating layer made of Polyethylene terephthalate (PET) and two conductive layers made of aluminum foil. A thickness of the insulating layer can be 12 um, and a thickness of the aluminum foil can be 1 um.

Mixing cathode electrode active substances of lithium cobalt oxides (LiCoO2), conductive carbon black, and polyvinylidene difluoride (PVDF) by a weight ratio of 97.5:1.0:1.5. Adding N-methylpyrrolidone (NMP) as solvent to the mixture of the cathode electrode active substances to make slurry having a solid content of 0.75.

Stirring the slurry evenly and coating the slurry onto the two conductive layers of composite current collector. Preserving a blank area 104 at two opposite ends of each of the two conductive layers and the middle portion 103 of one of the two conductive layers, a length of the blank area 104 can be 40 mm, and a width of the composite current collector can be 75 mm.

Cutting an aluminum foil having a length of 60 mm, a width 23*a* of 75 mm, and a thickness of 10 um as a first conductive connector 20, folding the aluminum foil in half along a length direction and coating this aluminum foil onto the first end 101 of the composite current collector. The aluminum foil can be soldered to the composite current collector. After being folded in half, the aluminum foil has a length 23*b* of 30 mm.

Soldering an electrode tab 40 to the first conductive connector 20 (as shown in FIG. 8.1).

E2. Formation of the Anode Electrode Plate.

Preparing an Anode Current Collector Made of Copper Foil.

Mixing anode electrode active substances of silicon carbide, conductive carbon black, and styrene-butadiene rubber (SBR) by a weight ratio of 95:1:4. Adding deionized water as solvent to the mixture of the anode electrode active substances to make slurry having a solid content of 0.49.

Stirring the slurry evenly and coating the slurry onto two opposite surfaces of the anode current collector. Preserving a blank area 104 at two opposite ends of the anode current collector, a length of the blank area 104 can be 5 0 mm.

E3. Formation of the Electrode Assembly 500.

Sequentially arranging the cathode electrode plate, the separator, and the anode electrode plate and coiling along a predetermined direction to obtain an electrode assembly 500 (as shown in FIG. 9.2).

The electrode assembly 500 can be filled with electrolyte for battery, encapsulated, and then formatted to be a battery.

The following chart shows mean values of all-cell resistances of batteries formatted according to the second to ninth embodiments, the first comparison embodiment, and the second comparison embodiment.

| embodiments | all-cell resistance (MΩ) |
|---|---|
| second embodiment | 43.0 |
| third embodiment | 43.5 |
| fourth embodiment | 41.2 |
| fifth embodiment | 37.1 |
| sixth embodiment | 37.5 |
| seventh embodiment | 37.2 |
| eighth embodiment | 39.3 |

| embodiments | all-cell resistance (MΩ) |
|---|---|
| Ninth embodiment | 38.0 |
| first comparison embodiment | 130 |
| second comparison embodiment | 58.3 |

Each mean value of an all-cell resistance of a corresponding embodiment is obtained from over 10 samples.

The chart shows that by applying the first conductive connector 20 to electrically connect to the first conductive layer 120 and the second conductive layer 130, when the electrode plate 100 is coiled to make the electrode assembly 500, the electrode plate 100 can be coiled along a predetermined direction and the protrusion 210 of the first conductive connector 20 can be folded to the second end 102. The protrusion 210 can be electrically coupled to the first conductive layer 120 or the second conductive layer 130. Equivalently, the electrode plate 100 is folded in two half portions, and the two half portions are in parallel with each other, thus reducing transmission path of electrons along the electrode plate 100 and internal resistance of corresponding electrode assembly 500.

The embodiments shown and described above are only examples. Even though numerous characteristics and advantages of the present technology have been set forth in the foregoing description, together with details of the structure and function of the present disclosure, the disclosure is illustrative only, and changes may be made in the details, including matters of shape, size, and arrangement of the parts within the principles of the present disclosure, up to and including the full extent established by the broad general meaning of the terms used in the claims.

What is claimed is:

1. An electrode plate comprising:
   a current collector comprising two opposite surfaces, the current collector comprises an insulating layer, a first conductive layer, and a second conductive layer, the first conductive layer and the second conductive layer are arranged on opposite side surfaces of the insulating layer; and
   a first conductive connector;
   wherein the first conductive connector electrically connects the two opposite surfaces;
   the first conductive connector is a metallic foil, a first end of the metallic foil is electrically connected to the first conductive layer, and a second end of the metallic foil is electrically connected to the second conductive layer.

2. The electrode plate of claim 1, wherein
   the electrode plate further comprises two electrode active substance layers;
   wherein the two electrode active substance layers are respectively coated on the first conductive layer and the second conductive layer.

3. The electrode plate of claim 2, wherein the electrode plate further comprises an electrode tab;
   the current collector comprises:
      a first end;
      a second end opposite to the first end; and
      a middle portion located between the first end and the second end;
   the electrode tab is selectively connected to the first end, the second end or the middle portion.

4. The electrode plate of claim 3, wherein the first conductive connector is located at the first end or the middle portion and protrudes out of the current collector along a width direction of the current collector.

5. The electrode plate of claim 4, wherein each of the first end and the second end of the current collector comprises a blank area without coating with the electrode active substance layers; and the first conductive connector electrically connects two opposite surfaces of the blank area of the first end, and a protrusion of the first conductive connector electrically connects to the blank area of the second end.

6. The electrode plate of claim 4, wherein the electrode plate further comprises a second conductive connector; and the second conductive connector is located at the second end and electrically connects the two opposite surfaces of the current collector.

7. The electrode plate of claim 6, wherein the second conductive connector protrudes out of the current collector along a width direction of the current collector;
   a protrusion of the second conductive connector is located correspondingly to a protrusion of the first conductive connector, and the protrusion of the second conductive connector is configured to attach to the protrusion of the first conductive connector.

8. The electrode plate of claim 6, wherein the current collector comprises a first side and a second side opposite to the first side along the width direction;
   a side of the first conductive connector is aligned with the first side, and another side of the first conductive connector protrudes out of the second side.

9. The electrode plate of claim 8, wherein two opposite sides of the second conductive connector are respectively aligned with the first side and the second side.

10. The electrode plate of claim 8, wherein one of two opposite sides of the second conductive connector is aligned with the first side, and the other one of the two opposite sides of the second conductive connector protrudes out of the second side.

11. The electrode plate of claim 8, wherein a length of the second conductive connector along the width direction is less than a length of the first conductive connector along the width direction, and a distance between a side of the second conductive connector and the first side is larger than a distance between a corresponding side of the first conductive connector and the first side.

12. The electrode plate of claim 2, wherein the electrode plate further comprises a second conductive connector, and the second conductive connector electrically connects the two opposite surfaces;
   each of the first conductive connector and the second conductive connector is a bendable metallic foil, and two ends of the bendable metallic foil are respectively coupled to the first conductive layer and the second conductive layer by soldering.

13. The electrode plate of claim 2, wherein the electrode plate further comprises a second conductive connector, and the second conductive connector electrically connects the two opposite surfaces;
   each of the first conductive connector and the second conductive connector is a bendable metallic foil, two ends of the bendable metallic foil are respectively coupled to the first conductive layer and the second conductive layer through conducting resin.

14. An electrode assembly comprising:
a cathode electrode plate;
an anode electrode plate; and
a separator disposed between the cathode electrode plate and the anode electrode plate;
wherein at least one of the cathode electrode plate and the anode electrode plate is an electrode plate comprising:
a current collector comprising:
an insulating layer comprising two opposite side surfaces;
a first conductive layer; and
a second conductive layer; and
two electrode active substance layers;
wherein the first conductive layer and the second conductive layer are arranged on the opposite side surfaces; and the two electrode active substance layers are respectively coated on the first conductive layer and the second conductive layer; and
a first conductive connector;
wherein
the first conductive connector is a metallic foil, a first end of the metallic foil is electrically connected to the first conductive layer, and a second end of the metallic foil is electrically connected to the second conductive layer;
the electrode assembly is formed by coiling the cathode electrode plate, the separator, and the anode electrode plate.

15. The electrode assembly of claim 14, wherein the electrode plate further comprises an electrode tab;
the current collector comprises:
a first end;
a second end opposite to the first end; and
a middle portion located between the first end and the second end;
the electrode tab is selectively connected to the first end, the second end or the middle portion.

16. The electrode assembly of claim 15, wherein the first conductive connector is located at the first end or the middle portion and protrudes out of a peripheral side of the current collector along a width direction of the current collector;
when the electrode plate is coiled along a predetermined direction and the first end is located in an inner side, a protrusion of the first conductive connector is folded to the second end and electrically coupled to the first conductive layer or the second conductive layer.

17. The electrode assembly of claim 16, wherein each of the first end and the second end of the current collector comprises a blank area not coated with the electrode active substance layers; the protrusion of the first conductive connector is folded to the blank area of the second end, and the protrusion electrically connects two opposite surfaces of the blank area of the second end.

18. The electrode assembly of claim 17, wherein the electrode plate further comprises a second conductive connector; the second conductive connector is located at the second end and electrically connects the two opposite surfaces of the current collector;
when the electrode plate is coiled along a predetermined direction and the first end is located in an inner side, the second end is located in an outer side, a protrusion of the first conductive connector is folded to the second end and electrically coupled to the second conductive connector.

19. The electrode assembly of claim 18, wherein the protrusion of the first conductive connector is folded to a peripheral side of the electrode assembly and electrically connected to the peripheral side of the electrode assembly.

20. The electrode assembly of claim 18, wherein the second conductive connector protrudes out of a peripheral side of the current collector along a width direction of the current collector;
a protrusion of the second conductive connector is located correspondingly to a protrusion of the first conductive connector, and the protrusion of the second conductive connector is configured to attach to the protrusion of the first conductive connector.

* * * * *